CONTROL SYSTEM AND PRINTER CONTROLLED THEREBY

Filed Oct. 12, 1965 28 Sheets-Sheet 1

Feb. 17, 1970 W. S. GORRILL ET AL 3,496,547

CONTROL SYSTEM AND PRINTER CONTROLLED THEREBY

Filed Oct. 12, 1965 28 Sheets-Sheet 5

| X | 8 | 4 | 2 | 1 | U | CHAR |
|---|---|---|---|---|---|---|
| 0 | 0 | 0 | 0 | 0 | 0 | □ |
| 1 | 0 | 0 | 0 | 1 | 0 | 1 |
| 2 | 0 | 0 | 1 | 0 | 0 | 2 |
| 3 | 0 | 0 | 1 | 1 | 0 | 3 |
| 4 | 0 | 1 | 0 | 0 | 0 | 4 |
| 5 | 0 | 1 | 0 | 1 | 0 | 5 |
| 6 | 0 | 1 | 1 | 0 | 0 | 6 |
| 7 | 0 | 1 | 1 | 1 | 0 | 7 |
| 8 | 1 | 0 | 0 | 0 | 0 | 8 |
| 9 | 1 | 0 | 0 | 1 | 0 | 9 |
| 10 | 1 | 0 | 1 | 0 | 0 | 0 |
| 11 | 1 | 0 | 1 | 1 | 0 | + |
| 12 | 1 | 1 | 0 | 0 | 0 | - |
| 13 | 1 | 1 | 0 | 1 | 0 | . |
| 14 | 1 | 1 | 1 | 0 | 0 | : |
| 15 | 1 | 1 | 1 | 1 | 0 | NOT USED |
| | | | | | | |

| X | 8 | 4 | 2 | 1 | U | CHAR |
|---|---|---|---|---|---|---|
| 16 | 0 | 0 | 0 | 0 | 1 | □̲ |
| 17 | 0 | 0 | 0 | 1 | 1 | 1̲ |
| 18 | 0 | 0 | 1 | 0 | 1 | 2̲ |
| 19 | 0 | 0 | 1 | 1 | 1 | 3̲ |
| 20 | 0 | 1 | 0 | 0 | 1 | 4̲ |
| 21 | 0 | 1 | 0 | 1 | 1 | 5̲ |
| 22 | 0 | 1 | 1 | 0 | 1 | 6̲ |
| 23 | 0 | 1 | 1 | 1 | 1 | 7̲ |
| 24 | 1 | 0 | 0 | 0 | 1 | 8̲ |
| 25 | 1 | 0 | 0 | 1 | 1 | 9̲ |
| 26 | 1 | 0 | 1 | 0 | 1 | 0̲ |
| 27 | 1 | 0 | 1 | 1 | 1 | +̲ |
| 28 | 1 | 1 | 0 | 0 | 1 | -̲ |
| 29 | 1 | 1 | 0 | 1 | 1 | .̲ |
| 30 | 1 | 1 | 1 | 0 | 1 | :̲ |
| 31 | 1 | 1 | 1 | 1 | 1 | NOT USED |
| | | | | | | |

□ REPRESENTS A SPACE WITHOUT INPUT CODE ADAPTERS

FIG. 5 : 8-4-2-1 CODE

| RANK | 8 | 4 | 2 | 1 | U |
|---|---|---|---|---|---|
| 0 | | | | | 1 |
| 1 | 0 | 0 | 0 | 1 | |
| 2 | 0 | 0 | 1 | 0 | |
| 3 | 0 | 0 | 1 | 1 | |
| 4 | 0 | 1 | 0 | 0 | |
| 5 | 0 | 1 | 0 | 1 | |
| 6 | 0 | 1 | 1 | 0 | |
| 7 | 0 | 1 | 1 | 1 | |
| 8 | 1 | 0 | 0 | 0 | |
| 9 | | 0 | 0 | 1 | |
| 10 | | 0 | 1 | 0 | |
| 11 | | 0 | 1 | 1 | |
| 12 | | 1 | 0 | 0 | |
| 13 | | | 0 | 1 | |
| 14 | | | 1 | | |
| | | | | | |

RECOGNITION CODE FOR SHIFT REGISTERS

FIG. 7C

CONTROL SYSTEM AND PRINTER CONTROLLED THEREBY

Feb. 17, 1970 W. S. GORRILL ET AL 3,496,547

CONTROL SYSTEM AND PRINTER CONTROLLED THEREBY

Filed Oct. 12, 1965 28 Sheets-Sheet 8

CONTROL SYSTEM AND PRINTER CONTROLLED THEREBY

Filed Oct. 12, 1965 28 Sheets-Sheet 9

TIMING (P-PULSE) GENERATOR-451

CONTROL PULSE GENERATOR GATES -641

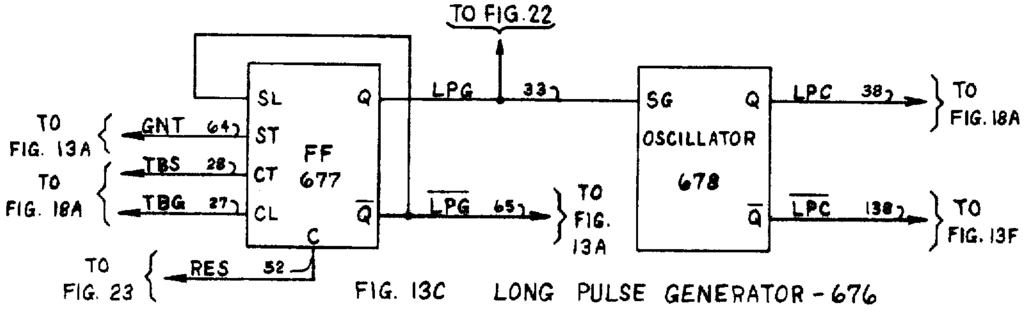
FIG. 13C LONG PULSE GENERATOR-676
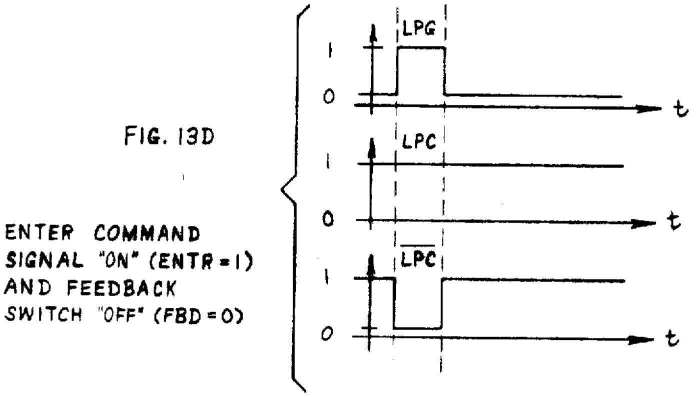
FIG. 13D
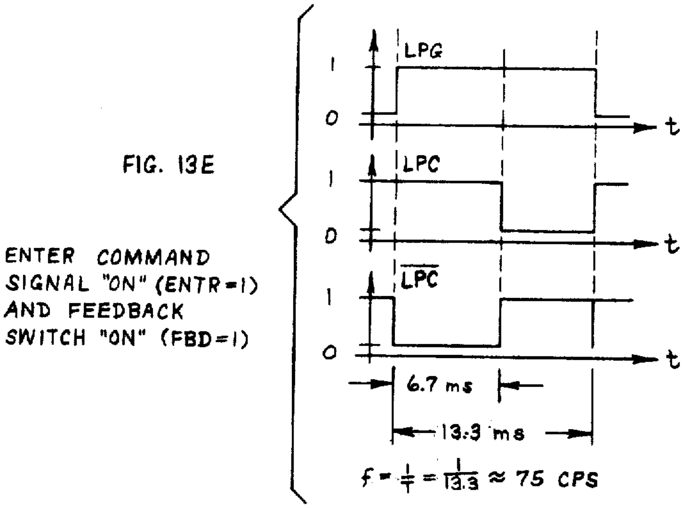
FIG. 13E

DELAY PULSE GENERATOR-691

WAVE FORMS SHOWING OPERATION WITH ENTER COMMAND SIGNAL ON, WITH FEEDBACK SWITCH ON, AND P-PULSE OCCURRING SLIGHTLY BEFORE ENTER COMMAND SIGNAL IS RECEIVED.

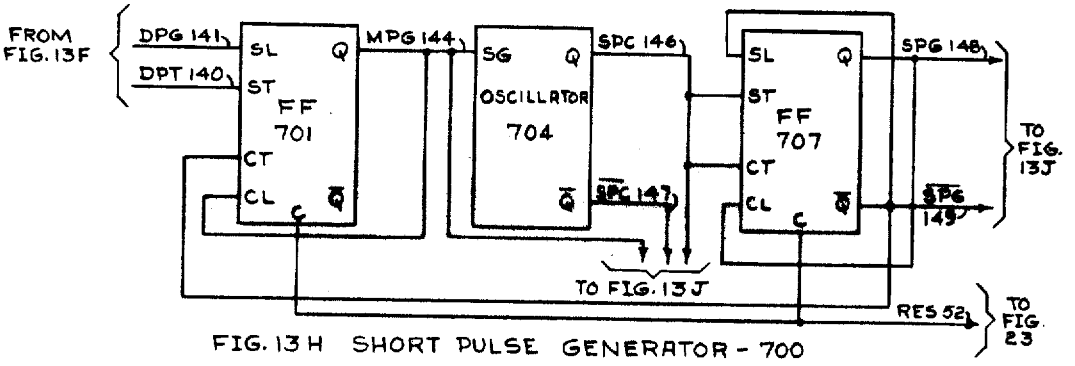
FIG. 13H SHORT PULSE GENERATOR - 700
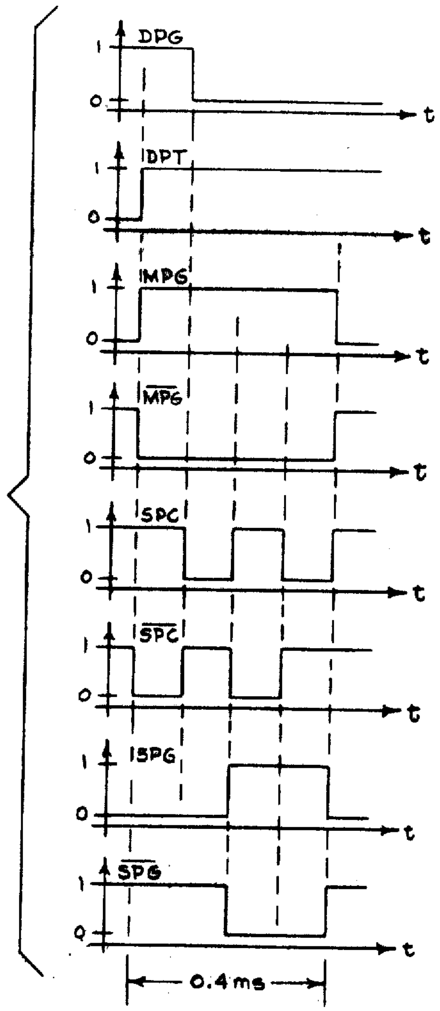
FIG. 13I

SHORT PULSE GENERATOR GATES -716

RESET GATES - 526

PULSE TIMING DIAGRAM

INPUT COUNTER-731

| X | | 2* | 4 | 2 | 1 |
|---|---|---|---|---|---|
| 0 | | 0 | 0 | 0 | 0 |
| 1 | | 0 | 0 | 0 | 1 |
| 2 | | 1 | 0 | 0 | 0 |
| 3 | | 1 | 0 | 0 | 1 |
| 4 | | 1 | 0 | 1 | 0 |
| 5 | | 1 | 0 | 1 | 1 |
| 6 | | 1 | 1 | 0 | 0 |
| 7 | | 1 | 1 | 0 | 1 |
| 8 | | 1 | 1 | 1 | 0 |
| 9 | | 1 | 1 | 1 | 1 |
| | | | | | |

2*-4-2-1 CODE FOR CHARACTER COUNTER (731)

WAVEFORMS FOR CHARACTER COUNTER

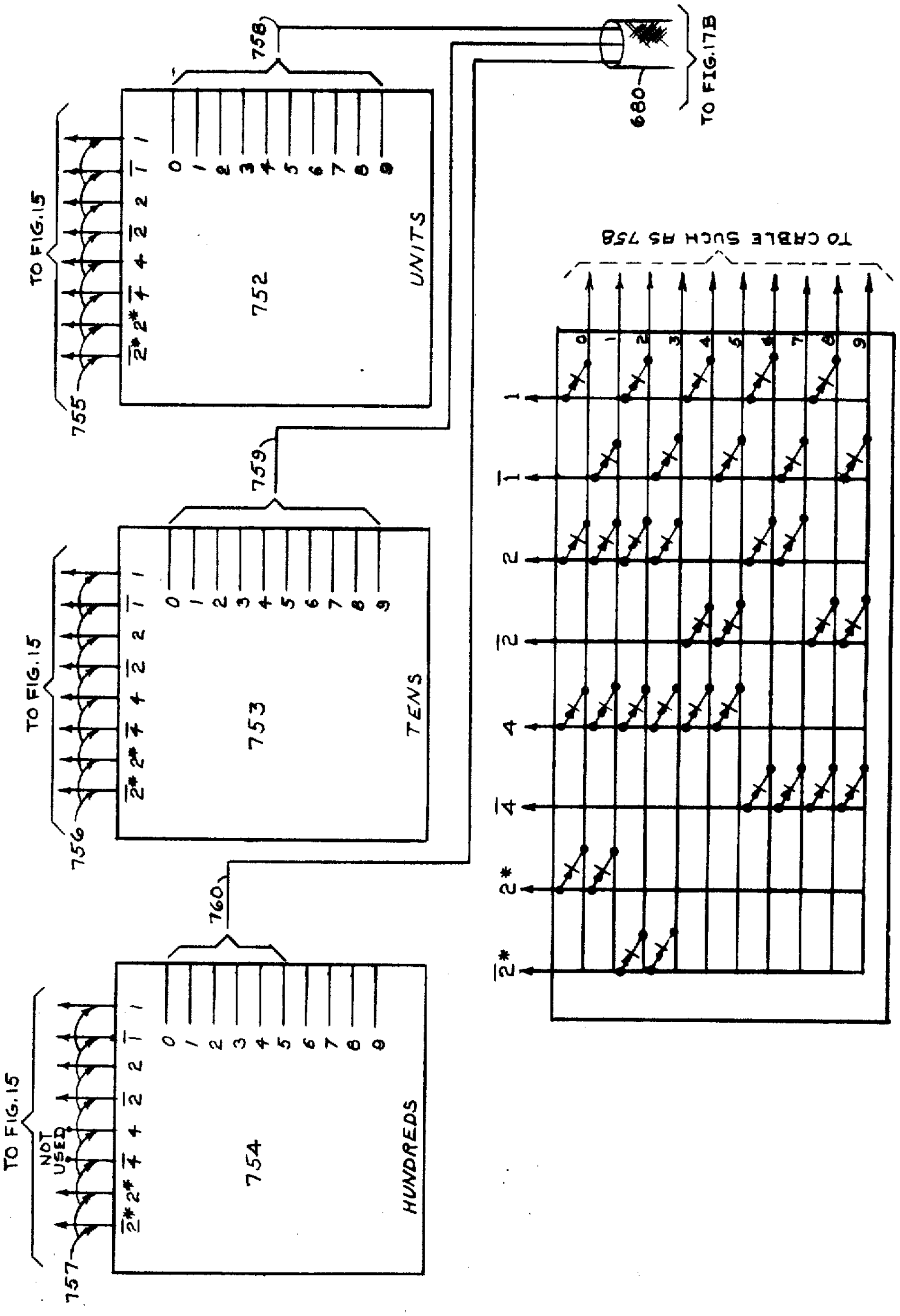
FIG. 16A TAB DECODER - 751, FIG. 16B DECODER BOARD CONVERTER

CONTROL SYSTEM AND PRINTER CONTROLLED THEREBY

Filed Oct. 12, 1965 28 Sheets-Sheet 23

TAB PANEL SWITCHES

CONTROL SYSTEM AND PRINTER CONTROLLED THEREBY

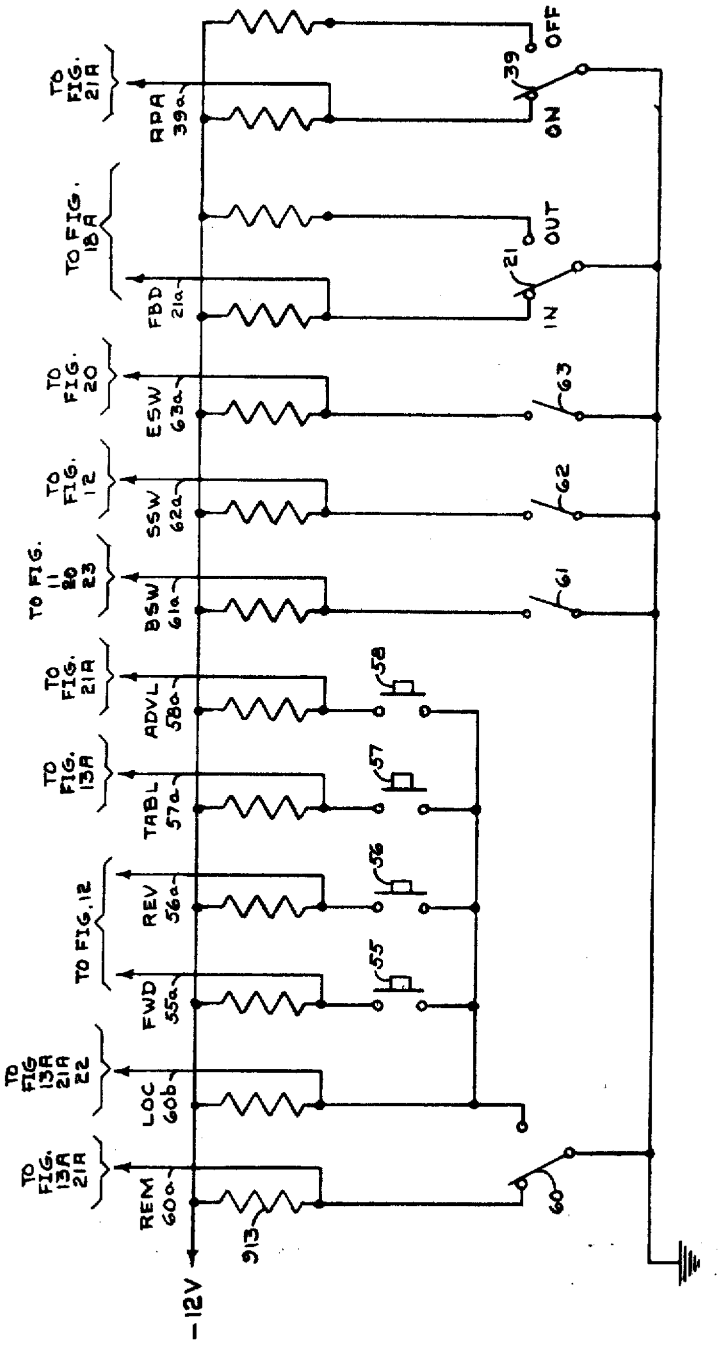
FIG. 19 SWITCH ASSEMBLIES

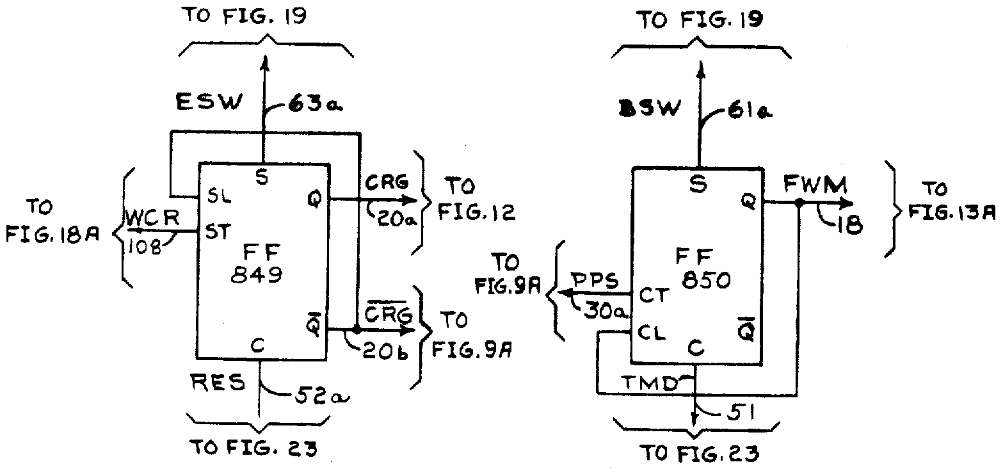
FIG. 20 LIMIT SWITCH REGISTERS - 841
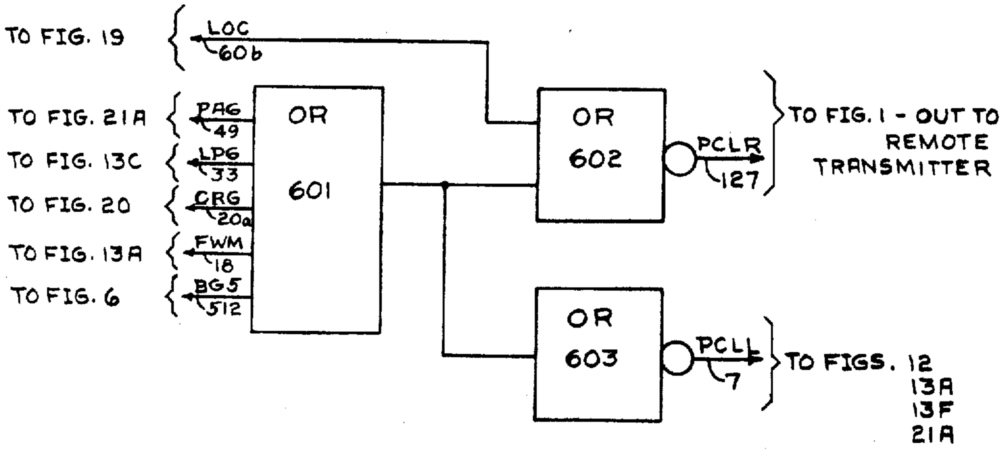
FIG. 22 FEEDBACK GATES - 600

Feb. 17, 1970 W. S. GORRILL ET AL 3,496,547

CONTROL SYSTEM AND PRINTER CONTROLLED THEREBY

Filed Oct. 12, 1965 28 Sheets-Sheet 28

RIBBON DRIVE CONTROL CIRCUIT

United States Patent Office 3,496,547
Patented Feb. 17, 1970

3,496,547
CONTROL SYSTEM AND PRINTER CONTROLLED THEREBY

William Sterling Gorrill, Manhasset, and Kenneth A. Wilson, Locust Valley, N.Y., assignors, by mesne assignments, to American Chain & Cable Company Inc., New York, N.Y., a corporation of New York Filed Oct. 12, 1965, Ser. No. 495,162
Int. Cl. G11b *13/00;* G06f *1/00, 7/00*
U.S. Cl. 340—172.5 20 Claims

ABSTRACT OF THE DISCLOSURE

This invention relates to a system for controlling mechanical means in response to code signals and more particularly to a rapid speed data printer and control system adapted to receive information from a remote transmitter, and to translate this information by means of a final readout printing device into characters and symbols on a chart. Displacement of a mechanical means, e.g. the carriage of the herein disclosed embodiment, relative to a reference point is synchronized with input code signals so that it is speeded up, slowed down or stopped in accordance with whether and to the extent that a difference signal is greater than zero or equal to zero.

In general, the system and mechanism to be described hereinafter to exemplify the present invention will accept parallel five bit character information of the binary coded type, store it, and print it out in a preselected or programmed tabular form along lines on paper at a rate of speed up to about 75 characters per second. Programming and synchronizing means are provided so that the required input commands, printing commands, tabular arrangement commands, and other input control signals are generated for appropriate control of the required printer functions and final printout.

While character printers which accept and handle binary coded digital information are not new in the art, the prior art in such printing varies from the relatively low speeds of the teletypewriter up to the very high handling and printing speeds of the more complex and expensive computing apparatus. Devices hitherto available capable of printing in the medium speed range, between 30 characters per second and 200 characters per second, have left much to be desired.

Systems for rapid speed printing require the solution of many problems, including the storage and handling of binary coded digital information, the translation from the coded digital form to the final character readout form, means for printing at rapid speed, the coordination of input information with final printout and the positioning and synchronization of printing heads and/or character drums with coded input information.

In attempting to handle the rapid speed of printout required, certain prior devices have used a memory system for the purpose of accumulating and arranging an entire line of data, which then would be printed out a complete line at a time, as, for example, by means of a rotating drum. Such systems were generally very complex and costly. One feature of the printer described herein resides in the use of an "on the fly" printing head for rapid printing, thereby avoiding the need for rotating drums and minimizing the need for data storage devices. Other printing systems provide for stoppage of a movable carriage for printing and then repositioning the carriage for another step of printing, such as in many electric typewriter systems. The present system overcomes the speed limitations of this method by its continuous "on the fly" printing arrangement. At the same time, in accordance with the present invention, input information can be temporarily stored when the data input rate exceeds the output rate of the readout printer, so long as the rate at which a specific embodiment is capable of handling information is not exceeded.

The arrangements used in the synchronization of input character information with a particular readout mechanism have included the aforementioned rotating drums and in some cases rotating print wheels which have been used are synchronized or set to match up with a given input signal. In the present printer a much simplified arrangement is provided by means of small print hammers which are moved across the face of the chart paper and at the same time are synchronized with the input character information.

Synchronization in such devices requires, among other things, the coordination of input character information with print position information. It is a further feature of the present system that means are provided to sense the difference between the number of input characters received and the number of spaces shifted by the print carriage from a start position at the beginning of each line or print cycle. In accordance with an important feature of the present invention, the difference signal is used to provide automatic adjustments in the speed of printing to take into account variations in the rate of information input from the transmitter. Thus, the drawbacks usually encountered with "synchronously" operated transmitters and printers are avoided.

In practice, the data from a given transmitter may comprise a plurality of groups of characters with each group representative of a different variable condition which are periodically measured for transmission. One highly desirable way to print such characters is in tabular form with a separate column for each variable condition.

In accordance with yet another feature of the present invention, there is provided a unique system for programming beginning margins, ending margins, and a plurality of other tabular margin columns which may be controlled locally at the printing station or from the remote transmitter position.

The printer and system of the present invention is especially suited to meet present day demands for rapid printing and display of large masses of data in a readily recognizable and readable form. The unique degree of flexibility and relative simplicity provided by the present invention makes its use highly advantageous in handling data transmitted from a remote point. To this end, there are provided means for the transmission of "command" signals from the remote transmitter to the receiver-printer by which, at will, the paper can be advanced, changes in the tabular column settings can be made, carriage return can be initiated and by which input signal gating can be controlled. In addition, printout can be had on widely varying widths of paper from relatively narrow up to about 50 inches in width.

Accordingly, it is an object of the invention to provide a rapid speed character printer for binary coded digital input information in which there is combined with a rapid speed of printout, an enhanced degree of flexibility of control, all at a relatively low cost.

It is another object of the invention to provide a rapid speed digital to character printer which is efficient and reliable in operation.

Another object is, in a digital to character printout system, to provide automatic control of the speed of the printing carriage drive motor so that the rate at which the carriage is driven across the paper is responsive to the difference between the rate of information input and the rate of printout.

Another object is to provide a binary coded input character printout system in which means are provided that are responsive to the input information received from a remote transmitter for automatically synchronizing the position and actuation of the corresponding character hammers so that each is actuated whenever it is in its proper printing position relative to the paper independent of the actual sequence in which the information concerning a group of characters is transmitted and received.

A more specific object of the invention is to provide a highly advantageous means for varying the print impression or contrast on the paper.

Another more specific object of the invention is to provide a unique paper advance and paper drive positioning means whereby accurate increments of paper can be moved into printing position without interference to the printing operation.

Yet another more specific object of the invention is to provide a rapid speed character printing head which can print a character legibly while in a state of continuous motion Still another more specific object of the invention is to provide such a system in which any desired character can be printed with an underline without reversing the carriage.

A further more specific object of the invention is to provide such a system in which feedback signals generated at the printer are fed to the remote transmitter to regulate the flow of character information to the printer.

Other objects and advantages of the present invention will be apparent in the following description of a preferred embodiment, taken in conjunction with the accompanying drawings in which:

FIG. 5 is a view of charts showing the code used for the character printout.

FIG. 7C is a chart showing the recognition code for the storage (shift) registers.

FIGS. 10A–D are a series of diagrammatic views of the photosensitive pickup showing successive phases of operation.

Figure 11:
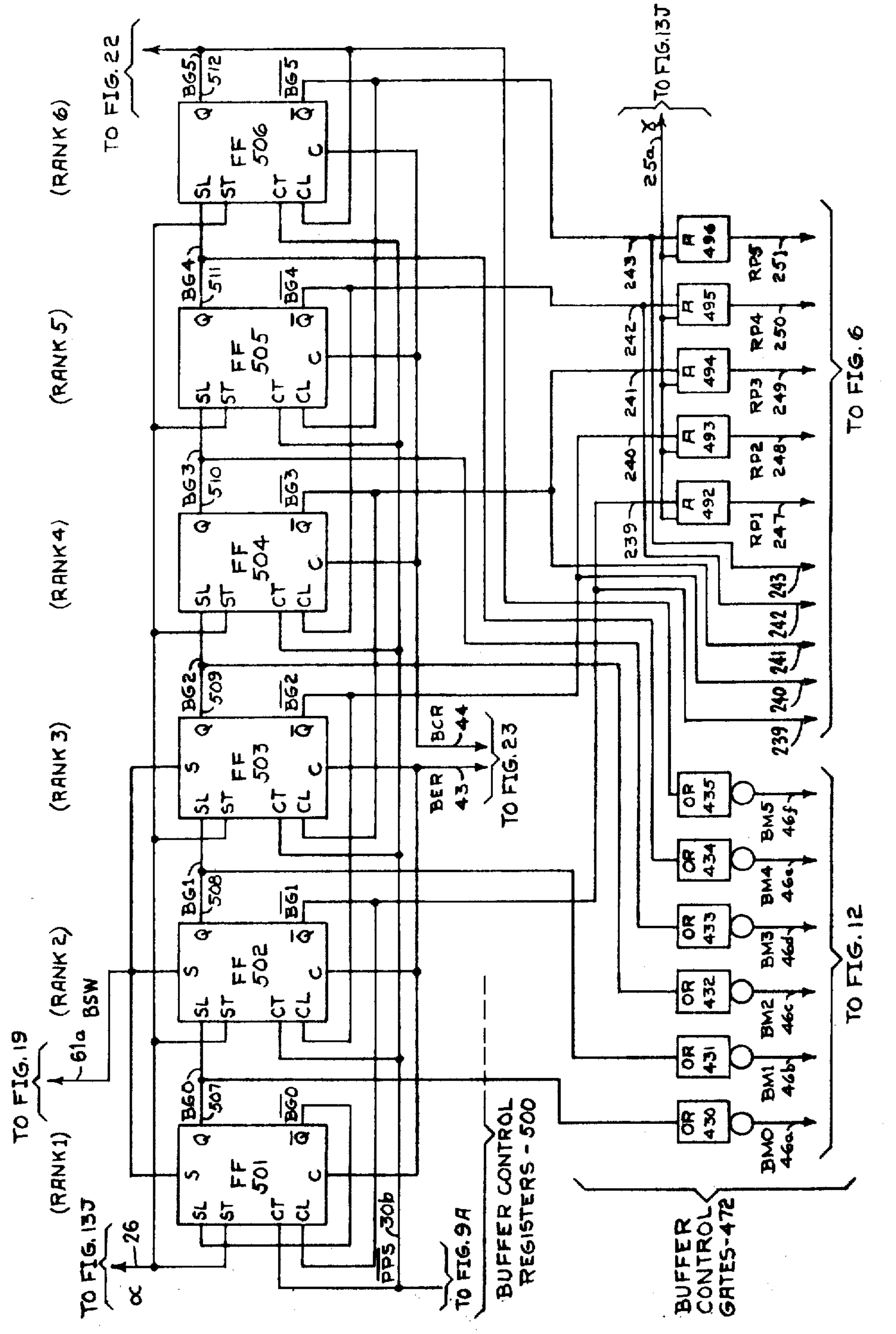

FIG. 11 is a diagram of the buffer control registers and gates with associated circuits.

Figure 12:
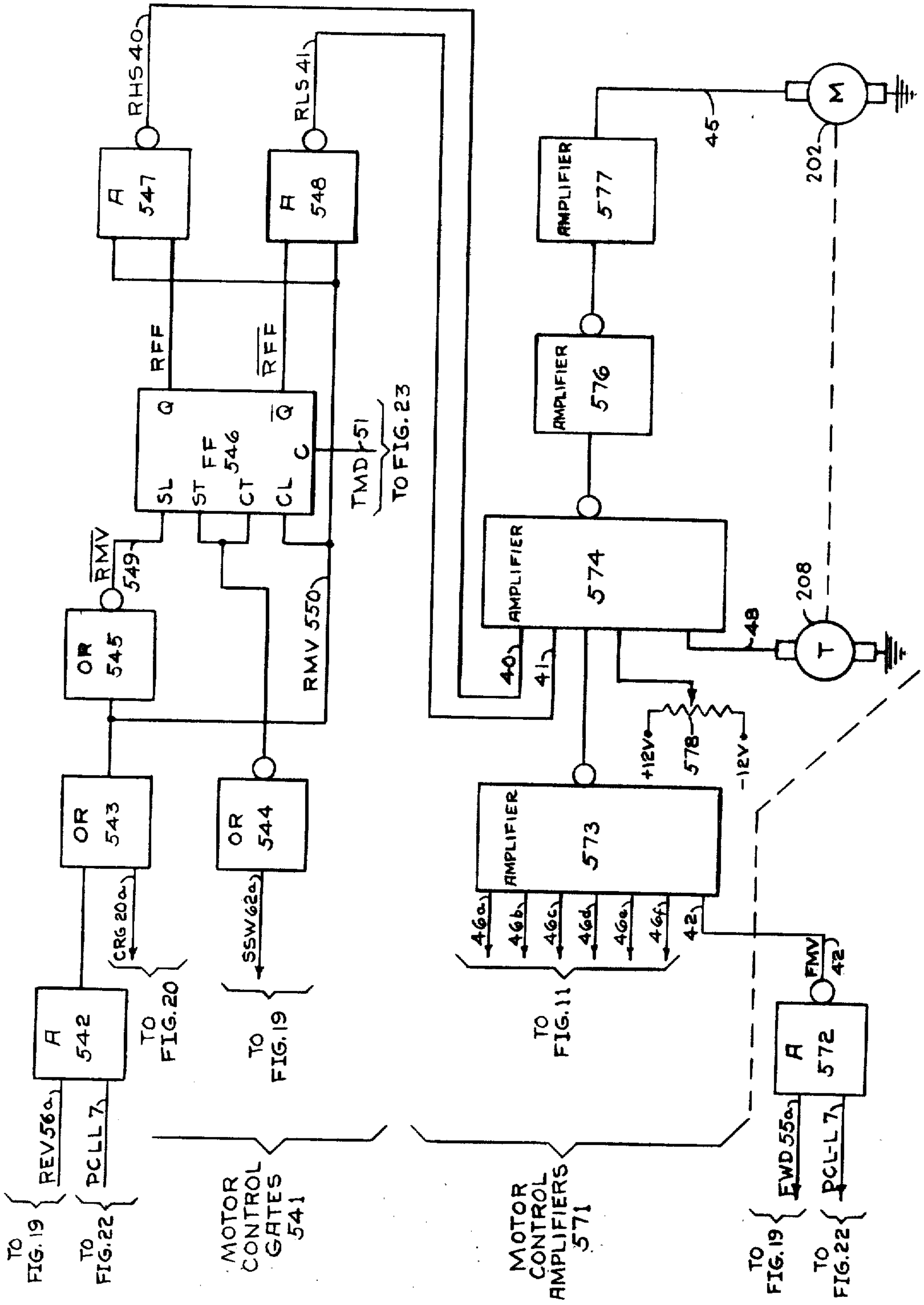

FIG. 12 is a diagram of the motor control circuitry.

Figures 13A, 13B:
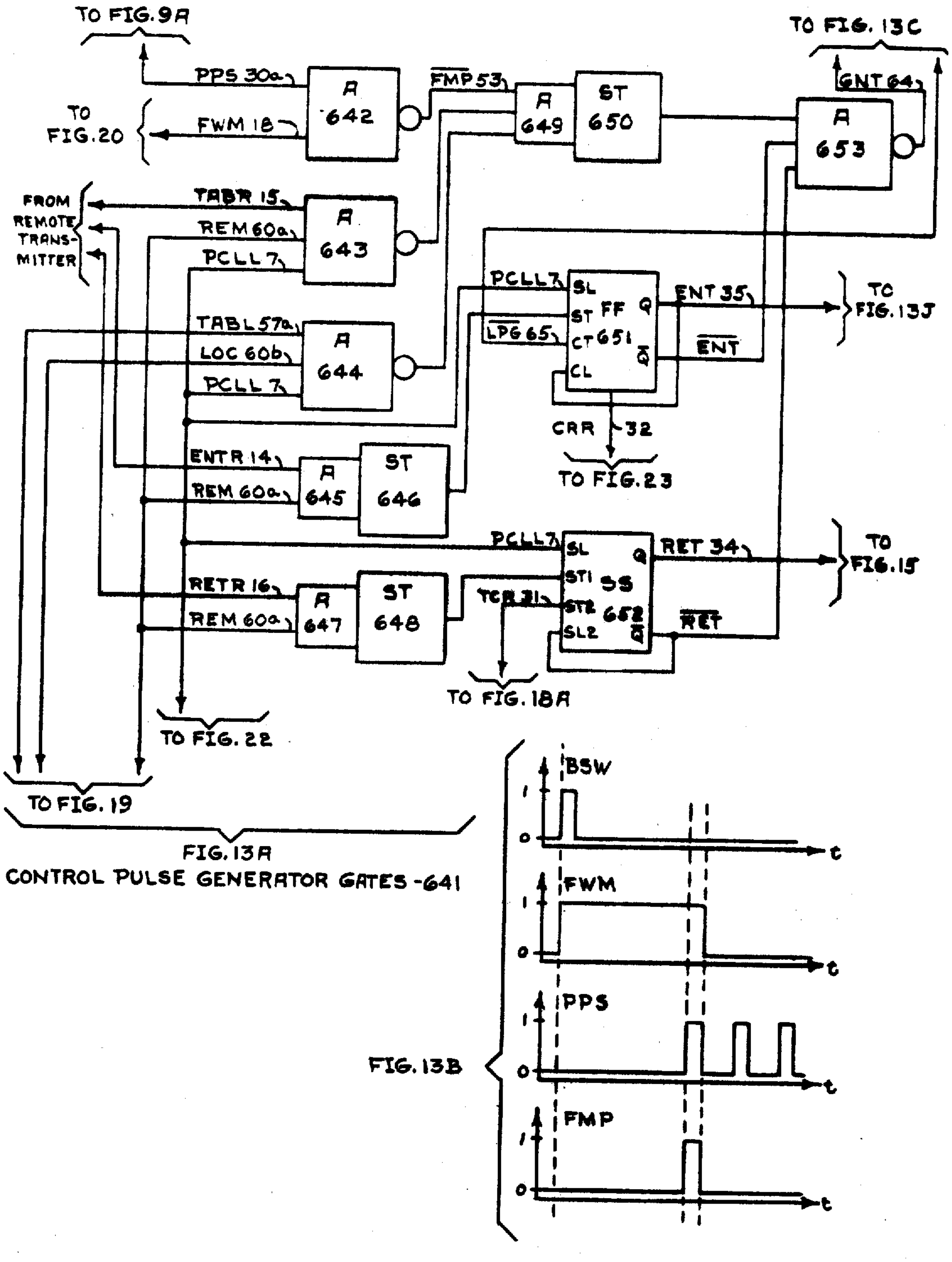

FIG. 13A is a diagram of the input gates for the control pulse generator.

FIG. 13B is a timing pulse diagram for one of the control pulse generator gates.

FIG. 13C is a diagram of the long pulse generator.

FIG. 13D is a timing pulse diagram of the long pulse generator when the feedback switch is off.

FIG. 13E is a timing pulse diagram of the long pulse generator when the feedback switch is on.

Figure 13F:
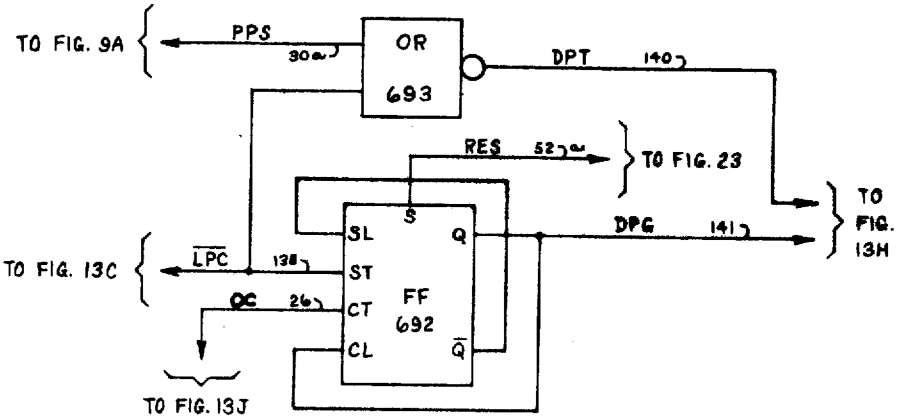

FIG. 13F is a diagram of the delay pulse generator.

Figure 13G:
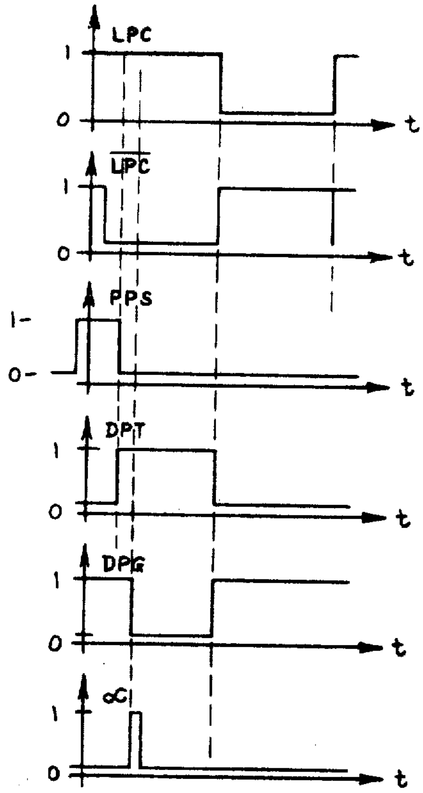

FIG. 13G is a timing pulse diagram of the delay pulse generator.

FIG. 13H is a diagram of the short pulse generator.

FIG. 13I is a timing pulse diagram for the short pulse generator.

Figure 13J:
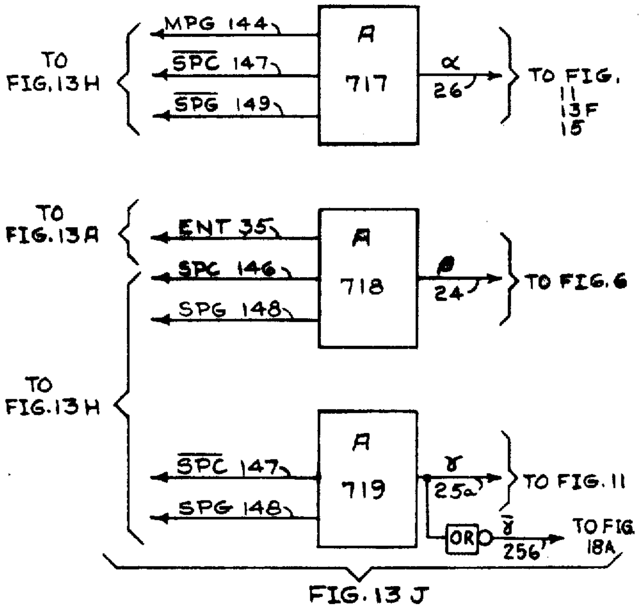

FIG. 13J is a diagram of the short pulse generatoı gates.

Figure 13K:
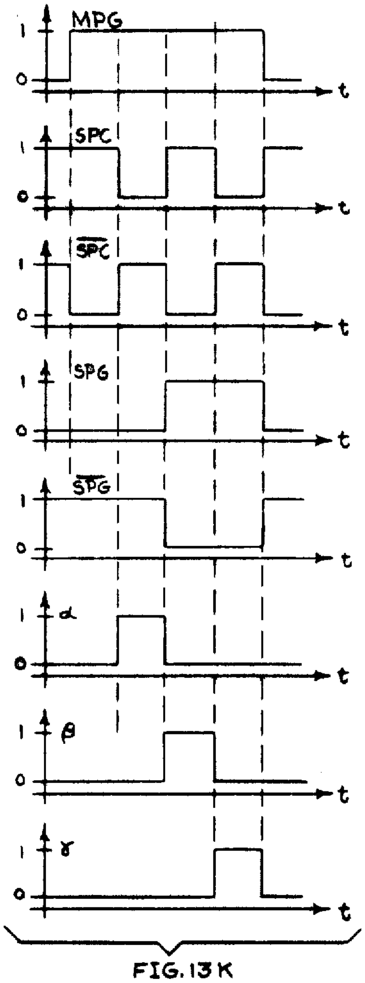

FIG. 13K is a pulse timing diagram for the short pulse generator gates.

Figure 14:
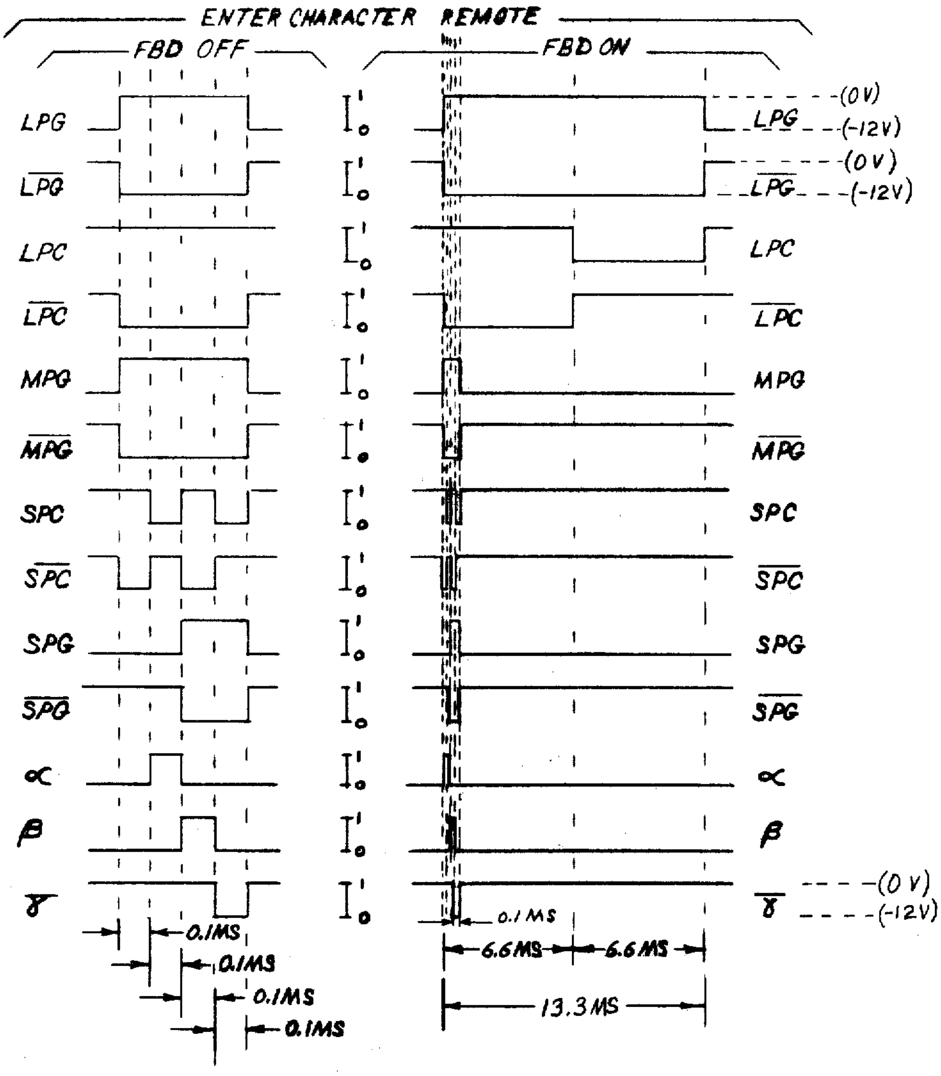

FIG. 14 is a timing pulse diagram showing the time relationships for various stages of the control pulse generator.

Figure 15A:
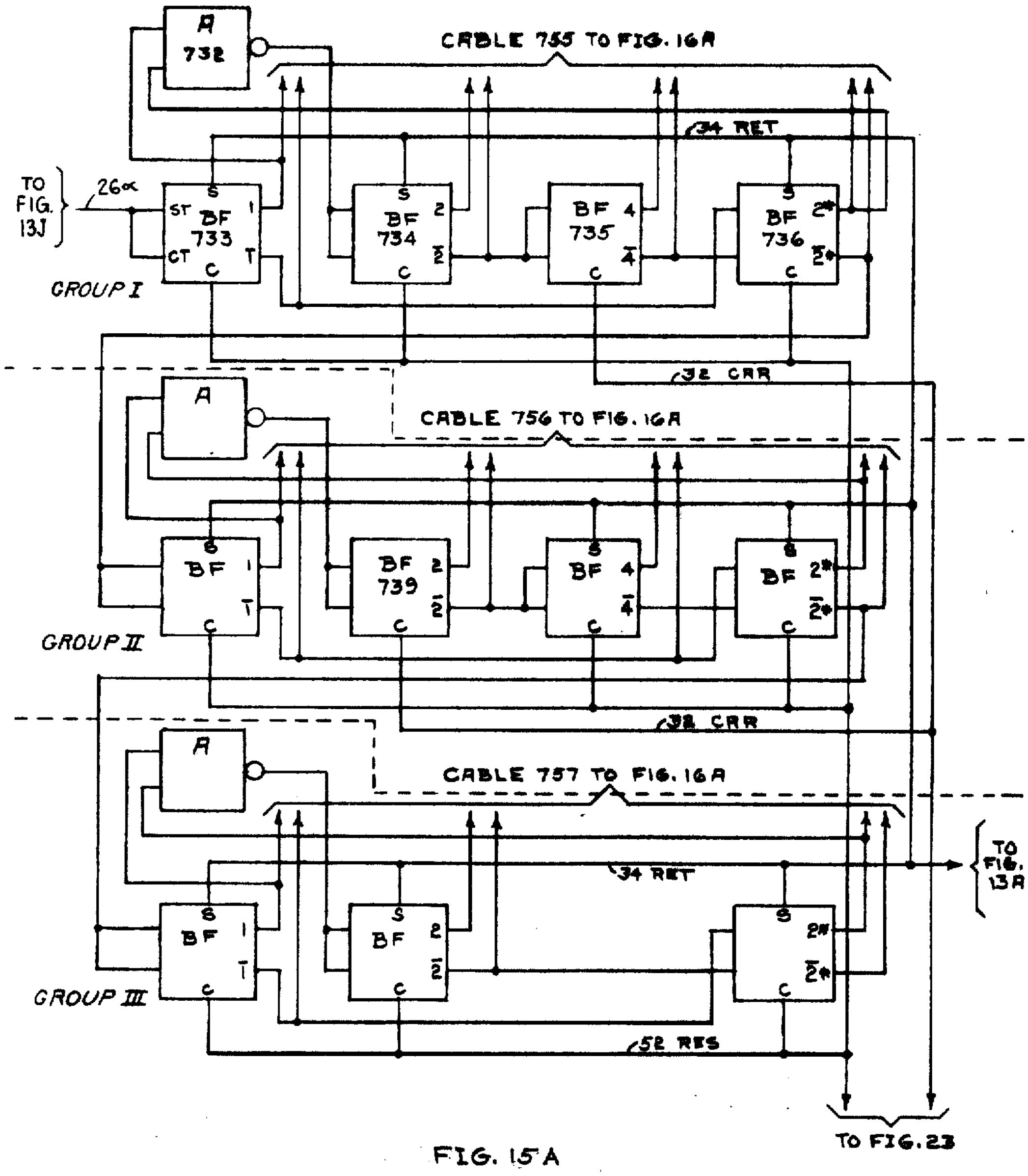

FIG. 15A is a diagram showing the character input counter.

Figures 15B, 15C:
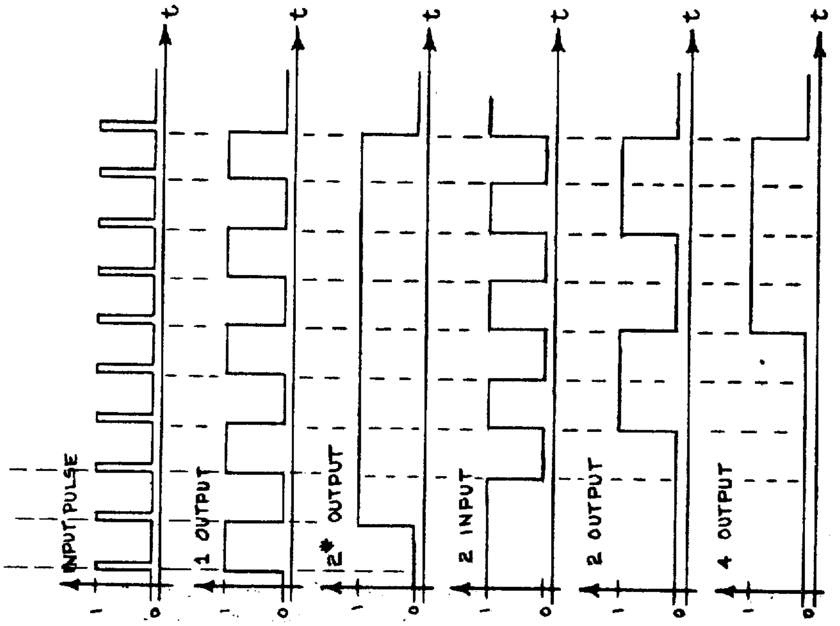

FIG. 15B is a chart showing the character input counter code.

FIG. 15C is a diagram showing the wave forms associated with the operation of the character input counter.

FIG. 16A is a diagram showing the tab decoder boards.

FIG. 16B is a diagram of the circuitry of a typical decoder board.

Figure 17A:
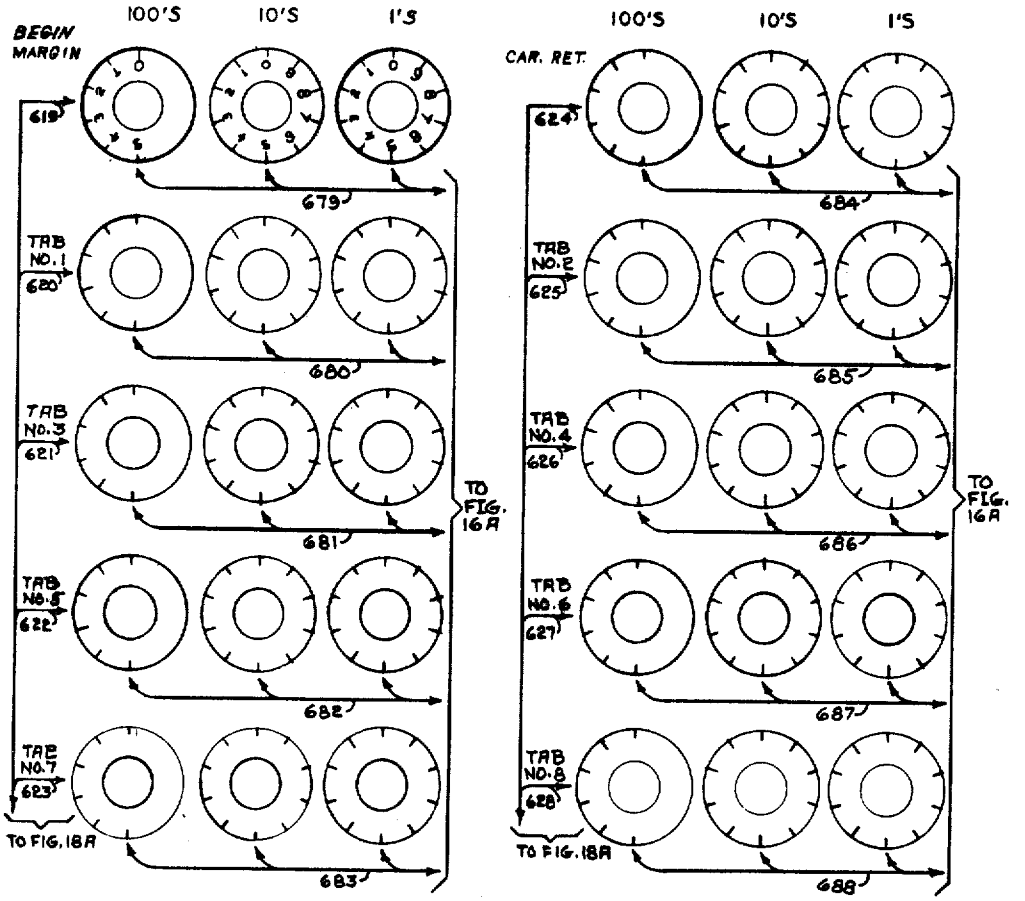

FIG. 17A is a view showing the tabular setting switches on the tab panel.

Figure 17B:
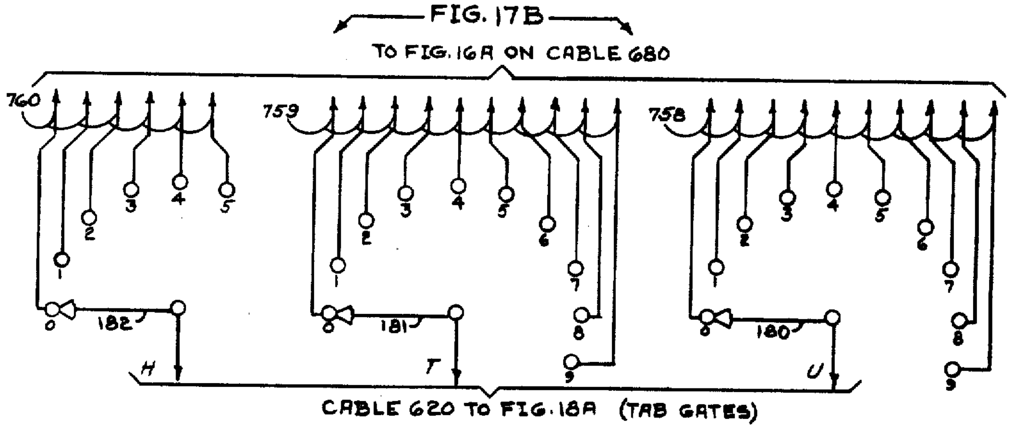

FIG. 17B is a schematic drawing of representative tab switches.

Figures 18A, 18B, 18C:
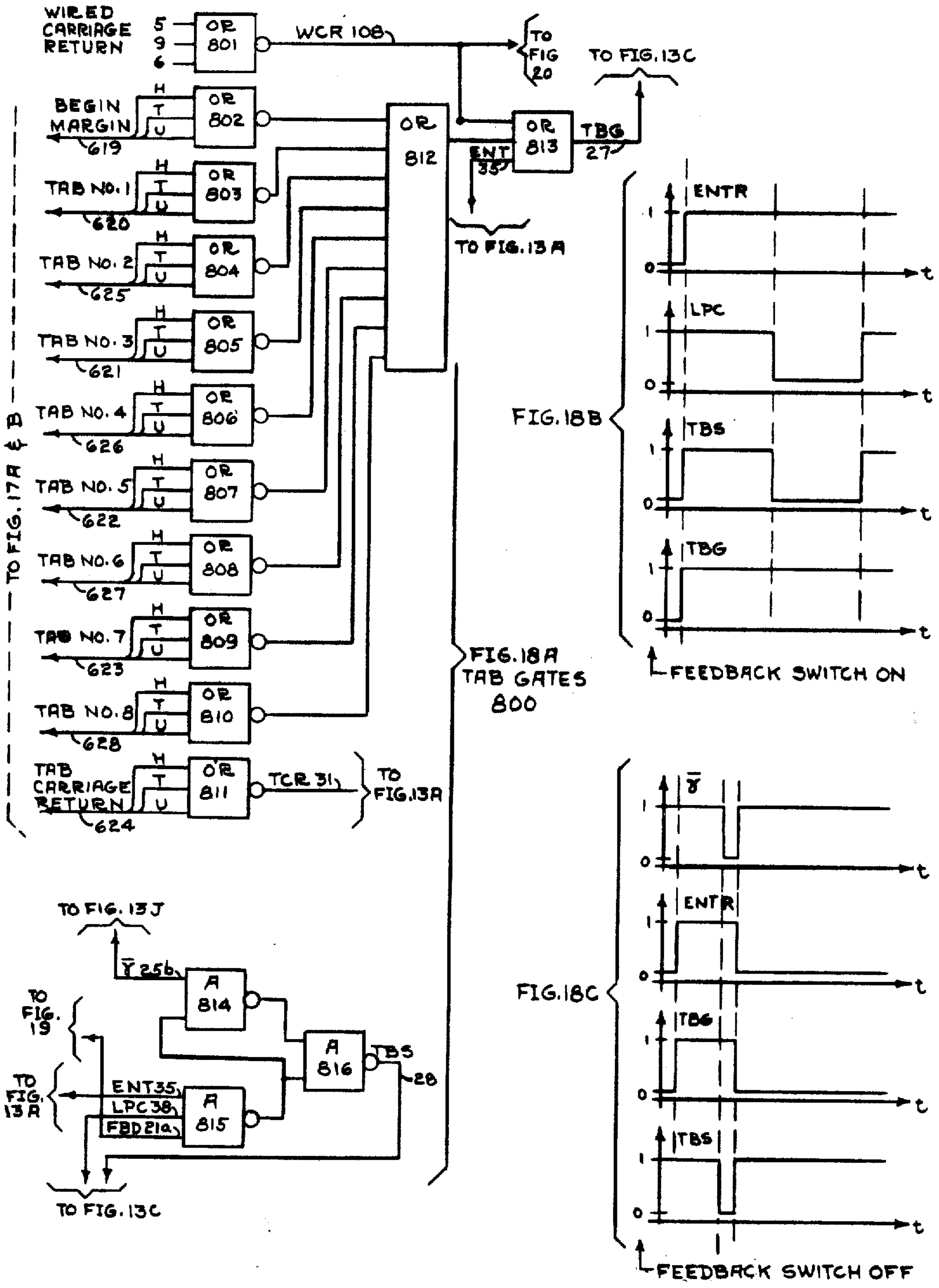

FIG. 18A is a diagram of the tab gates.

FIG. 18B is a pulse timing diagram of the tab gates with the feedback switch on.

FIG. 18C is a pulse timing diagram for the tab gates with the feedback switch off.

FIG. 19 is a schematic diagram showing the control switches provided.

FIG. 20 is a diagram of the limit switch registers.

Figures 21A, 21B, 21C:
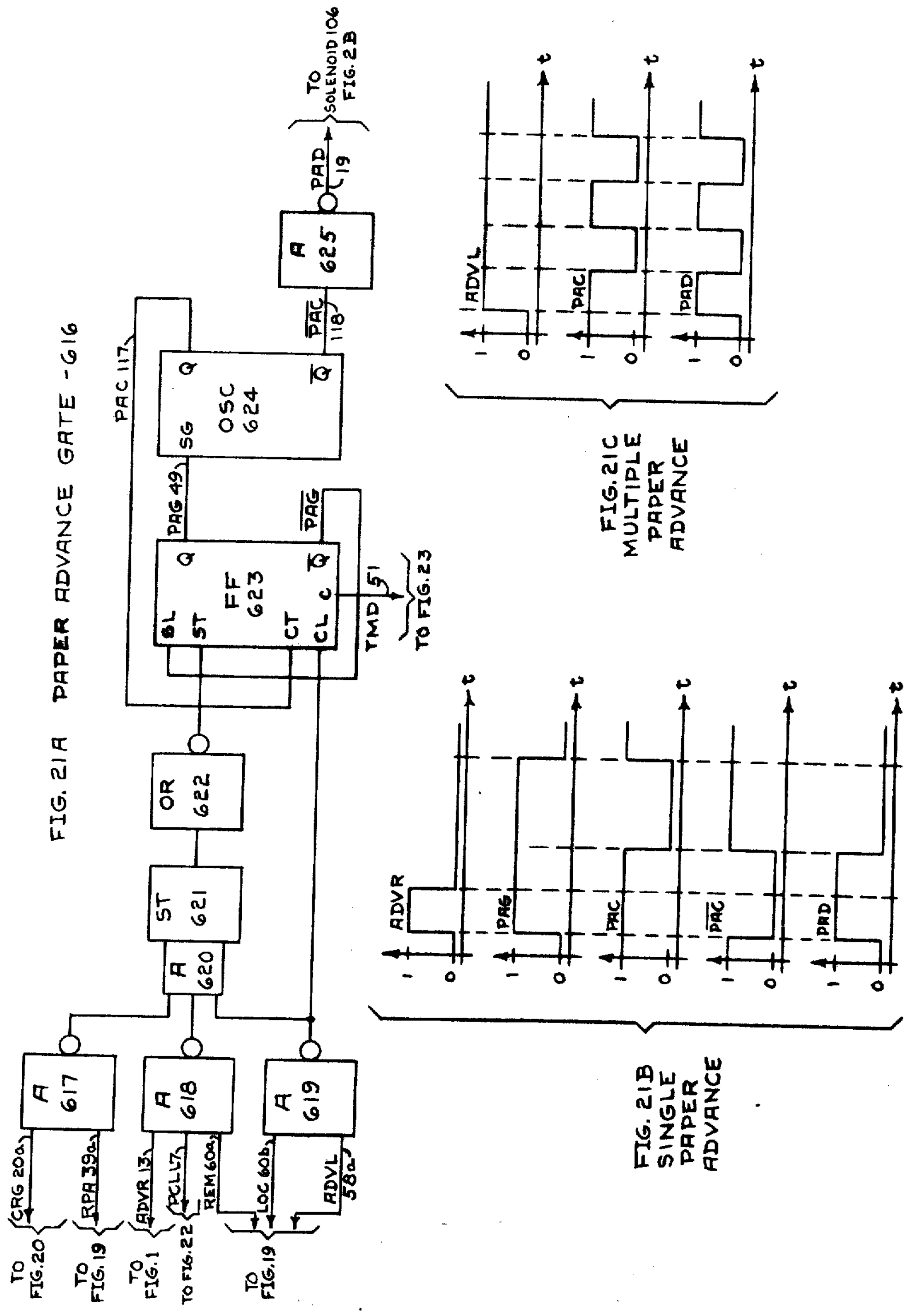

FIG. 21A is a diagram of the paper advance gate and generator.

FIG. 21B is a timing pulse diagram for a single paper advance.

FIG. 21C is a timing pulse diagram for multiple paper advance.

FIG. 22 is a diagram of the feedback gates.

Figure 23:
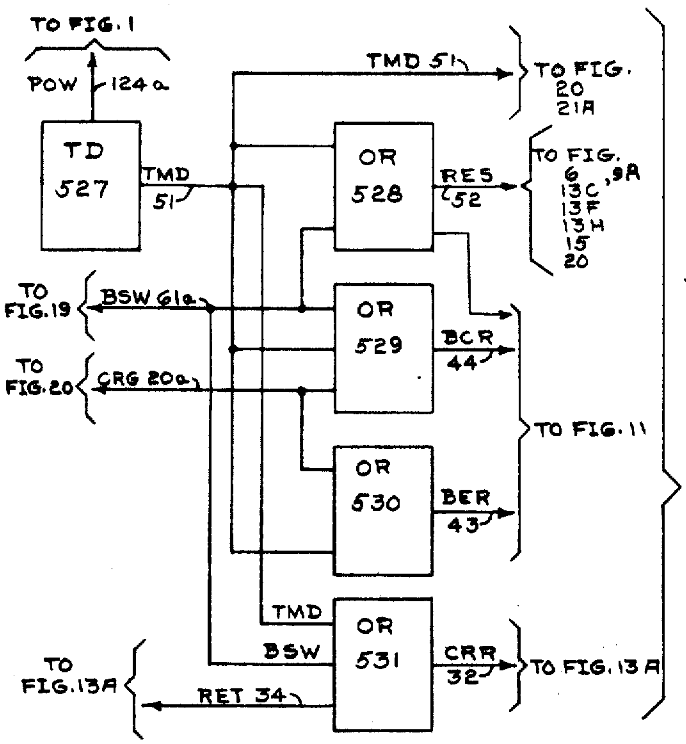

FIG. 23 is a diagram of the reset gates.

Figure 24A:
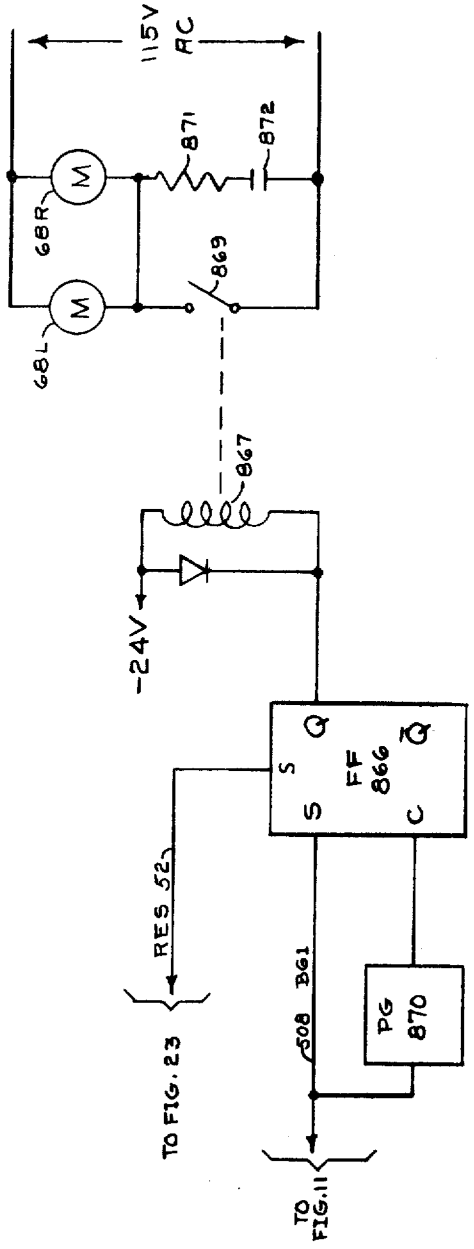
Figure 24B:
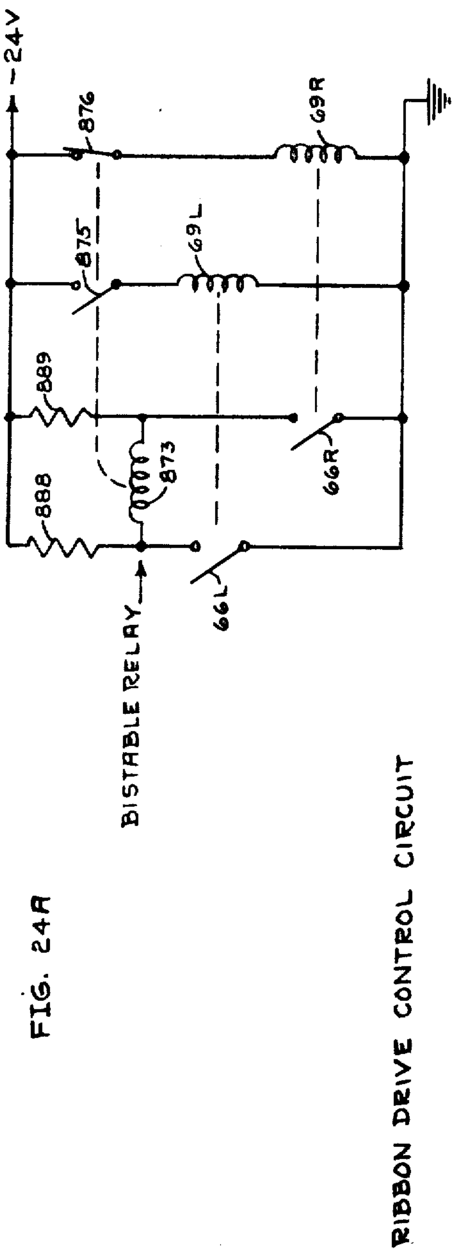

FIGS. 24A and 24B are diagrams of the ribbon drive control circuit.

Figure 1:
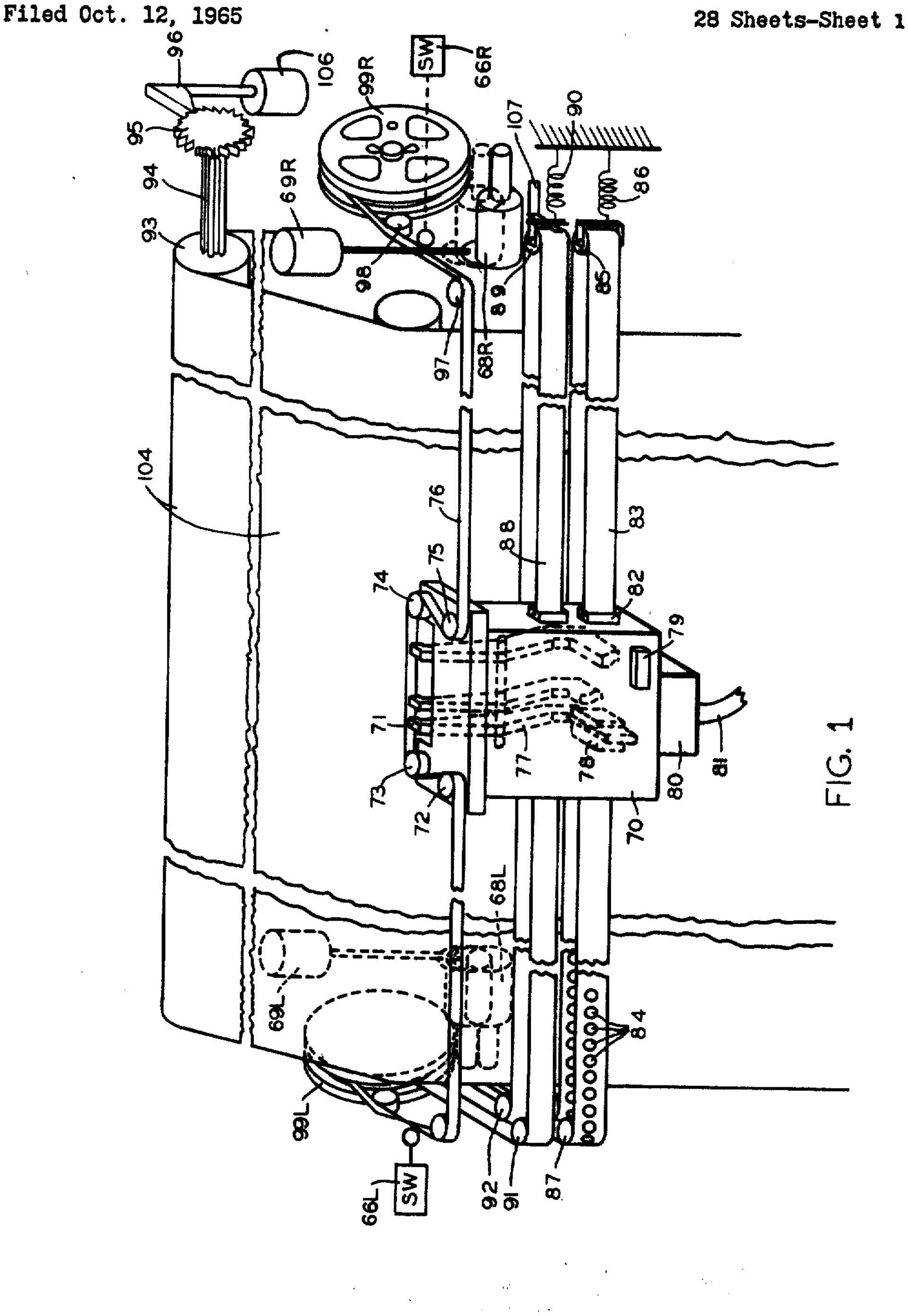
FIG. 1 is a perspective view, partially diagrammatic and to an exaggerated scale, for conveniently showing several of the print hammers and carriage and related mechanical appurtenances.
Figures 3, 4A, 4B:
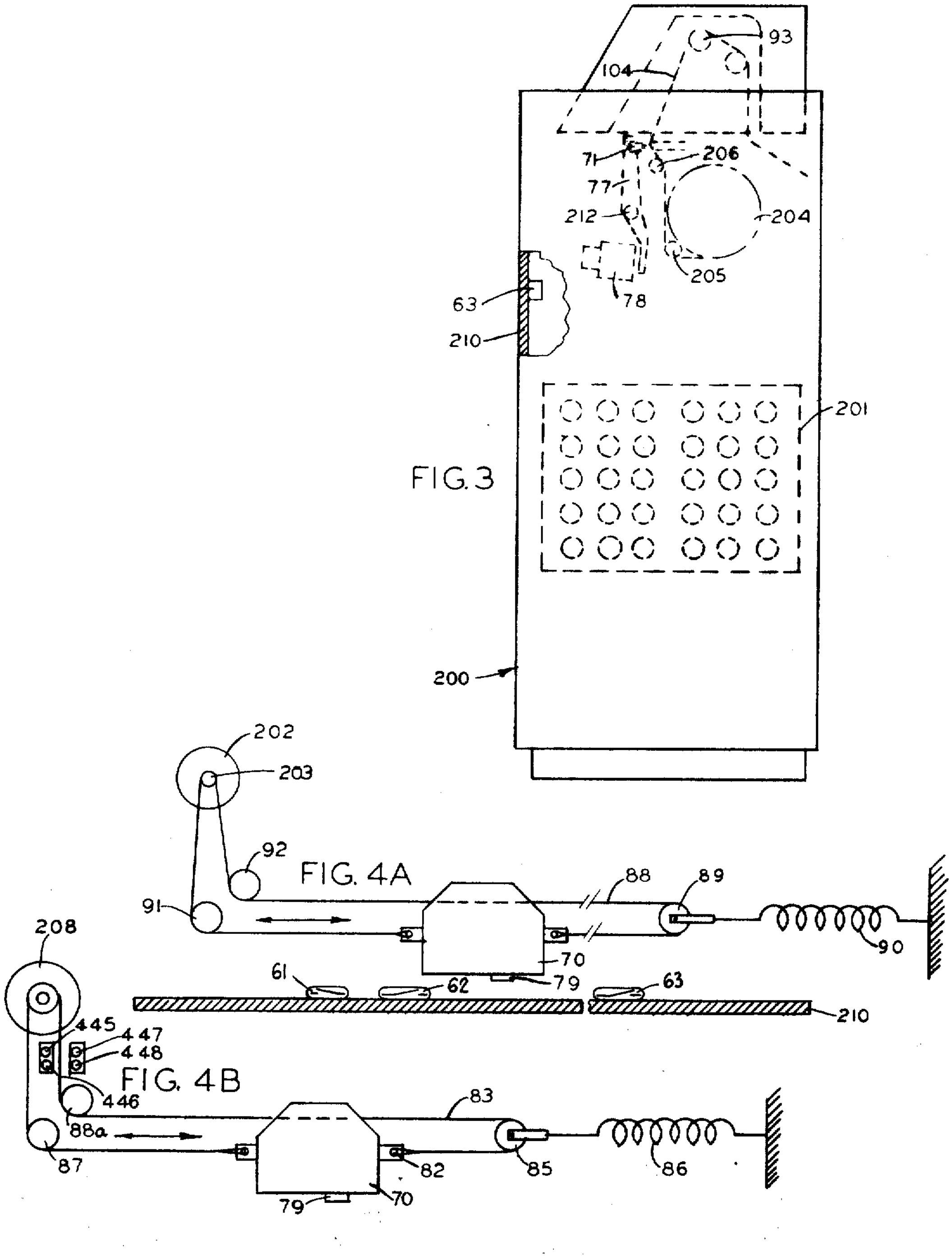
FIG. 3 is a side elevational view of the apparatus partially cut away for convenience.
FIG. 4A is a diagrammatic view of the printhead carriage, driving means and carriage position-sensitive switches.
FIG. 4B is a diagrammatic view of the print carriage and the position synchronizing means.

Referring now to FIGS. 1 and 3, in enclosure 200 a movable carriage 70 supports and carries 15 print hammers of which only three are shown and one is indicated at 71. Idler wheels 72, 73, 74 and 75 are rotatably mounted on carriage 70 and guide print ribbon 76 so that it is interposed between the print hammers and the chart or paper 104. Each of the print hammers 71 has an elongated arm portion 77 which is engirdled by an electromagnetic coil 78. A permanent magnet 79 is carried by the carriage 70 for actuating magnetic reed relay limit switches to be described below. Electrical connections for the parts on the carriage 70 are made by means of a detachable connector 80 at the end of a movable cable 81. Anchored to the opposite sides of print carriage 70 as indicated at 82 is a timing or synchronizing tape 83 preferably made of paper covered Mylar which moves with and indicates the instantaneous position of the print carriage 70. As indicated along the left portion of tape 83, it is provided with a large number of equidistant apertures 84 of equal diameter which are used for position-sensing and synchronization purposes in conjunction with a phototransistor pickup yet to be described. The synchronizing tape 83 is supported by roller bearing 85 and spring 86 at one end and by rollers 87 and 88*a* and the roller of tachometer 208 (FIG. 4B) at the other end.

Also attached to the print carriage 70 is a driving tape 88 driven by a controlled speed motor for moving and positioning the print carriage relative to the chart 104. The drive tape 88 which is also preferably made of paper covered Mylar, is supported at one end by roller bearing 89 and spring 90, and at its other end is supported by rollers 91, 92 and the shaft 203 of motor 202, the motor 202 also being supported in the enclosure 200. Damping bar 107 is used to keep the tape smooth, and free of vibration and ripple during speed changes.

Supporting the chart 104 is a support roller 93 mounted on splined shaft 94. Attached to the end of splined shaft 94 is a ratchet wheel 95 which is rotated by operation of paper advance solenoid 106 through solenoid arm 96.

The printing ribbon 76 for the printing hammers is seen to be threaded around rollers 97 and 98 onto spool 99R on the right-hand side. A similar arrangement is provided on the left-hand side for spool 99L. In addition, there are provided two solenoids 69L and 69R which are used to cause ribbon spool 99R to be driven by motor 68R or spool 99L to be driven by motor 68L. Operation is such that one or the other of solenoids 69R or 69L is energized, depending upon whether the right or left tape spools is being driven as a take-up spool until the driven spool is fully loaded, at which time the drive is reversed so that the unloaded spool is driven to withdraw the ribbon from the other spool. Ribbon tension-sensing switches 66L and 66R are provided, which respond to an increase in ribbon tension, adjacent to the respective spools and are activated when its associated spool is emptied.

Referring now to FIG. 3, a chart supply roll 204 is supported within printer enclosure 200, the right-hand end of which is shown. Paper 104 from supply roll 204 is fed over tension and guide rollers 205 and 206 to the printing area opposite the print hammers 71 and then up over guide roller 93.

Each of the fifteen printing hammers 71, only one of which is shown, is pivotally mounted as indicated at pivot 212. Fifteen electromagnetic coils 78 are provided with each being mounted on the arm portion 77 of its print hammer 71. Energization of a given coil 78 causes its print hammer to move about its pivot 212 and to strike the ribbon 76 and chart 104.

Also shown in FIG. 3 is a tab panel 201 which carries the tab switches for establishing the format of the printout. The enclosure 200 of the printer houses rail 210 on which are mounted three magnetically operated switches actuated by the position of printhead carriage 70.

Referring now to FIG. 4*a*, rotation of shaft 203 of the motor 202 drives tape 88, which in turn moves the print carriage 70. Carried by the print carriage 70 is a magnet 79 which, on being carried by carriage 70 into proximity with each of the spaced magnetic relay switches 61, 62, 63, serves to actuate it. In traversing its path from left to right, the carriage 70 and the magnet 79 first actuate the begin switch (BSW) 61. A short distance to the right of BSW 61, approximately six inches, for example, there is slow down switch (SSW) 62 which functions during reverse travel of the carriage 70 (right to left) for braking purposes. End switch (ESW) 63 is actuated as the carriage 70 reaches the end of its permissible travel in the forward direction.

As is most clearly shown in FIGS. 4B and 10A–10D, synchronizing tape 83 cooperates with lamps 445, 446 and phototransistors 447, 448 in the generation of pulses which serve to indicate the position of carriage 70, relative to the chart paper, referred to the programmed start position at the beginning of each line.

Associated power supply, logic control circuitry and other mechanisms are located within the enclosure 200.

General description of the system

The input information enters the printer from a transmitter in the form of a five bit binary coded character signal which may, as in the present instance, represent the following fifteen characters:

_, 1, 2, 3, 4, 5, 6, 7, 8, 9, 0, +, —, ·, :

These are the fifteen characters carried by the fifteen print hammers 71 in the sequence given, with the "_" (underline) being carried by the leading or right-hand hammer as viewed in FIG. 1.

The five bits which comprise a given character signal, though presented on the five lines 2*a*–2*e* on the input side of the buffer gates 230, do not enter until after an enter command, the ENTR pulse, is received on line 14 at the control pulse generator gates 641 and is responded to by the control pulse generator 640. In response to the ENTR pulse and in the absence of an inhibiting signal, the control pulse generator 640 provides an alpha pulse on its output line 26, a beta pulse on its output line 24 and a gamma pulse on its output line 25*a*. These three pulses are generated in the sequence alpha, beta and gamma.

The alpha pulse is fed along line 26 to buffer control registers 500 which in turn through the buffer control gates 472 and motor control amplifier 571 energizes motor 202 in its forward direction.

The beta pulse is fed along line 24 to the buffer gates 230, thereby permitting the entry of the character signal to the buffer registers. In the absence of any previously received character signals resting in the buffer registers, a given character signal on entry cascades through the successive registers of the buffer registers to the output registers which are connected by lines 110*a*–114*a* and 110*b*–114*b* to the first register set in the storage registers 300. On the other hand, if at the time of entry of the given character signal into the buffer registers, there already were character signals resting in any of the registers of the buffer registers, then the given signal instead of cascading to the output register set, comes to rest in the set of vacant registers that is nearest the output register set.

As will be more fully described hereinafter, the alpha pulse actuates the buffer control registers 500 to ensure retention of the character signal in the proper set of buffer registers 230 to which it has cascaded. The gamma pulse, fed along line 25*a* to the buffer control gates 472, actuates the latter to feed reset pulses along lines 247–251 to the buffer registers 230, whereby to erase redundant character information in the sets of buffer registers 230 through which the character signal had passed in cascading to its resting place in the buffer registers 230.

The motor 202 having been turned on as a consequence of the alpha pulse, its shaft 203 drives tape 88, thereby advancing carriage 70 from its programmed start position. The programmed start position, as will be more fully described, has the carriage positioned with the leading hammer just ahead of the first columnar printing space, and all of the buffer and storage registers are empty. Carriage 70 advances the synchronizing tape 83, and upon a predetermined advance of the tape 83, photo pickup 444 feeds a pulse along cable 12 to the timing pulse generator 451 which is thereupon actuated to feed a timed shift pulse or P-pulse (PPS) to the buffer registers 230 and to the storage registers 300. This P-pulse serves to shift to the right any character signals resting in the buffer and storage registers. The character signal resting in the output set of registers of the buffer registers 230 is shifted to the first set of registers (hereinafter also designated "rank 0") in the storage registers 300.

Another function of the buffer control registers 500 which will be more fully described hereinafter is that of controlling the motor 202 and thus the position of the carriage with its print hammers relative to the chart 104 in response to the alpha and timing or P-pulses. The buffer control registers add "1" for each alpha pulse and subtract "1" for each P-pulse, and the motor 202 is controlled depending upon whether the instantaneous difference between the number of alpha pulses and the number of P-pulses is greater or equal to zero. When this difference is greater than zero, the motor is energized and the speed of operation is further adjusted so that it is faster or slower as the difference is of larger or smaller magnitude. It will be evident, therefore, that an alpha pulse associated with a given enter command will turn on the motor if the motor is at rest or may increase the speed of operation of the motor if it is already in operation. On the other hand, the P-pulse generated by the operation of the motor in response to that alpha pulse will shut down the motor if it carries the difference count in the buffer control registers down to zero. Thus, the mechanical operation initiated in response to a given enter command in turn initiates a signal in the form of a timing pulse, and this timing pulse tends to reduce the speed of and can terminate the mechanical operation, without requiring further information from the transmitter.

It is to be understood, as will be more fully described hereinafter, that when the carriage 70 is set in motion from its programmed start position following the arrival of the first character signal, the motion of the carriage through its connection to the synchronizing tape 83 ensures that the resulting P-pulse shifts the first character signal into the first register set of the storage registers at the same time that the first or leading print hammers 71 is in alignment with and ready for printing in the first columnar space of this line cycle. However, the leading print hammer, which in this embodiment carries the character "underline" would be actuated at this time only if the first character signal were made up of the five bit binary code adopted to cause operation of this leading print hammer. Assuming that to be the case, the presence of that character signal in the first register set or rank 0 of the storage registers 300 is decoded by the hammer decoder drivers 341 to energize the coil 78 on the leading "underline" print hammer 71, whereby an underline is printed in the first columnar space of the line.

As was pointed out hereinabove, a feature of the present invention resides in the arrangement which makes it posible to underline any or all printed characters at will, without reversing the motion of the carriage at any time during the printing of an entire line. In the present system, the five bit binary code used includes one bit which is reserved for the character "underline" and the remaining four bits serve to identify all of the remaining characters. This is provided by the use of an "8–4–2–1–U" binary code in which the "U" binary digit designates the bit carrying the character "underline" information.

For example, when the first character to be printed in the first space at the start of the line is to be "3̲," the corresponding binary code or character signal is 0–0–1–1–1. When this five bit signal is shifted into the first register set (rank 0) of the storage registers 300, the "1" in the "U" binary digit by itself suffices to cause the printing of an "underline" in the first space of the line on the chart 104. The remaining four bits carrying the information for character "3" are also present in this first register set awaiting the next shift pulse.

Now, assuming operation of the printer continues with the reception of further character signals and ENTR pulses, a succession of P-pulses (shift pulses) is generated with each P-pulse representing a single columnar space advance of the carriage 70 along the print line. Each of these P-pulses causes a shift to the right of the character signals in the buffer registers 230 and storage registers 300. When the carriage has advanced four spaces, the hammer carrying character "3" is aligned with the first columnar space and four P-pulses, one for each column, will have been generated with a corresponding number of register shifts. By these four register shifts, the character "3" signal is shifted into the fourth register set (rank 3) in the storage registers 300 and it is instantly decoded by the hammer decoder drivers 341 to energize the coil 78 on the character "3" print hammer, whereby a "3" is printed above the "underline" which was previously printed in the first columnar space. Simultaneously as the coil 78 is energized, the output of the hammer decoder driver, as it energizes the hammer coil 78, also simultaneosuly erases the rank of registers being decoded. As will be pointed out, this makes it possible to reduce the number of registers needed in the storage register 300.

Printing is carried out along a given line in response to the character signals and enter commands or other commands received. If motion in the forward direction along the print line is not terminated by a return command from the transmitter or by a programmed command from the tab switches 781, the end switch 63 operates to return the carriage and thus prevent over-travel and possible damage. Thus, the carriage 70 on arriving in position, adjacent the right-hand end of its traverse, actuates the end switch 63, thereby providing an ESW pulse on line 63*a* to the limit switch register 841. This results in the return of the carriage to the programmed start position and clearing of the buffer registers 230 and storage registers 300.

In normal operation when the carriage 70 has traversed a predetermined number of spaces along the chart 104, as determined by the setting of a manually adjustable carriage return switch, part of tab panel switches 781 yet to be described, the system is put into its "carriage return mole." This is most conveniently described by reference to a particular situation. Assuming that the chart has useful spaces available along each line which may be numbered from 0–564, but only the first 300 spaces on each print line are required to handle the information, then the tab panel switches 781 are preset so that, after an actual count of 300 alpha pulses, which are received on line 26 by the input character counter 731 from the control pulse generator 640, the input character counter 731 is automatically jumped to an arbitrarily selected number, e.g., 575, larger than the aforementioned useful range 0–564. This is accomplished when the tab panel switches 781, on receipt of the information on lines 679–688 from tab decoder 751 that input character counter 731 has reached a count of 300, actuates the tab gates 800 to transmit a tab carriage return pulse on line 31 to the control pulse generator 640. The control pulse generator 640 now, through line 34, sets the input character counter from 300 to 575. The input character counter 731 is now reset from the 300 count to the arbitrarily selected count of 575 and this is caused by the control pulse generator 640 acting over line 34 (RET) to the counter 731 and to the reset gates 526, the latter in turn providing CCR "on" over line 32 to the counter 731. CRR "on" also goes to the gates of the control pulse generator 640 by means of line 32 and the control pulse generator starts the emission of a series of alpha and gamma pulses. The absence of beta pulses from this series serves to prevent the entry of character signals into the buffer gates and registers 230. The control pulse generator also at this time turns on line 33 to the feedback gates 600 which in turn turns off line 127 to indicate to the transmitter than the printer cannot accept data.

Operation in response to these alpha and gamma pulses is as was previously described. It is to be noted, however, that the gamma pulses on line 25*a* serve no useful function at this time because of the absence of beta pulses. The carriage 70 continues to advance and P-pulses are generated each of which causes a shift to the right in the buffer registers 230 and the storage registers 300. The number of alpha and gamma pulses in the series of such pulses generated by the control pulse generator 640 is preselected so that a sufficient number of P-pulses and corresponding shifts in the registers occur to ensure that all character information already entered into the buffer registers 230 and storage registers 300 have been acted upon by the hammer decoder drivers 341 and printed on the chart 104 before the travel of the carriage is reversed.

Assuming that the total number of register sets available in both the buffer registers 230 and the storage registers 300 is 21, then the generation of 21 alpha pulses and gamma pulses, after the input character counter 731 reached its actual count of 300, will ensure that no character information which may already be in the system will be erased, before it can be printed out.

Again using the number 21 as being equal to the total number of register sets in the buffer and storage registers, it is evident that the input character counter will count up from 575, the previously arbitrarily selected number, to 596.

When the input counter 731 reaches the number 596, this information is automatically conveyed through the tab decoder 751 and the tab panel switches 781 to the tab gates 800. The gamma bar pulse associated with the alpha pulse which brought the counter to 596, fed over line 25*b*, acts through the tab gates to terminate the series of alpha and gamma pulses. Line 108 connecting tab gates 800 to limit switch registers 841 is part of a wired carriage return which is also turned on by the tab gates 800 at the count of 596, which in turn causes the limit switch registers 841 to turn on line 20*a* to provide a carriage return gate signal (CRG) to (1) the motor control gates 541, (2) the reset gates 526, (3) the paper advance gates 616, and (4) the feedback gates 600. The motor control gates 541 now over line 40 call for a reverse high speed voltage from motor amplifier 571 which in turn provides reverse high speed operation of motor 202. The motor 202 in turn drives the printhead carriage 70 in the reverse direction back to the left-hand end of its path. In response to CRG, reset gates 526 now provide a reset pulse over lines 43 and 44 to the buffer control registers 500 which clears these registers. The paper advance gates 616, with the return with paper advance (RPA) switch 39 on, in response to CRG turns on line 19 to the paper advance solenoid 106 and advances the chart 104 one line. The feedback gates 600 also respond to CRG to ensure that line 127 remains "off" to indicate that the printer is not clear, now that the generation of the series of twenty-one alpha and gamma pulses has been completed. The feedback gates 600 also turn on PCL–L on line 7 to the control pulse generator 640 (FIGS. 13A, 13F). Upon generation of the return gate signal (CRG), its complement ($\overline{CRG}$) is fed to the timing pulse generator 451 to prevent the generation of P-pulses.

During the foregoing responses to CRG, the motor 202 has been driving the carriage in its reverse direction at full speed. When the carriage passes slow speed switch 62, its speed is reduced and then the carriage actuates the begin switch 61. Upon actuation of the begin switch 61, the direction of operation of the motor 202 is changed from reverse to forward as will be described.

Figure 2A:
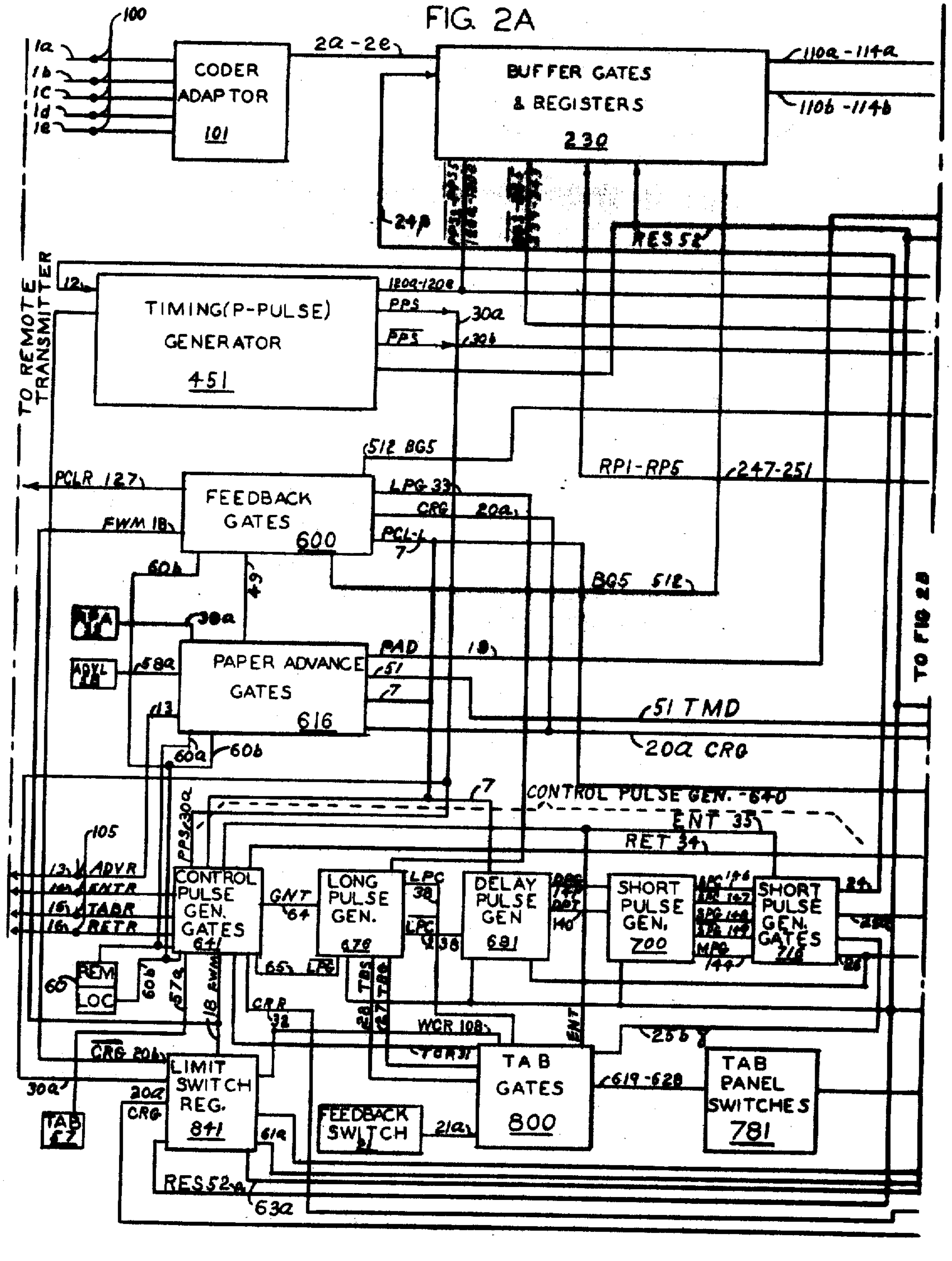
FIGS. 2A and 2B are block diagrams showing the system of the present invention.
Figure 2B:
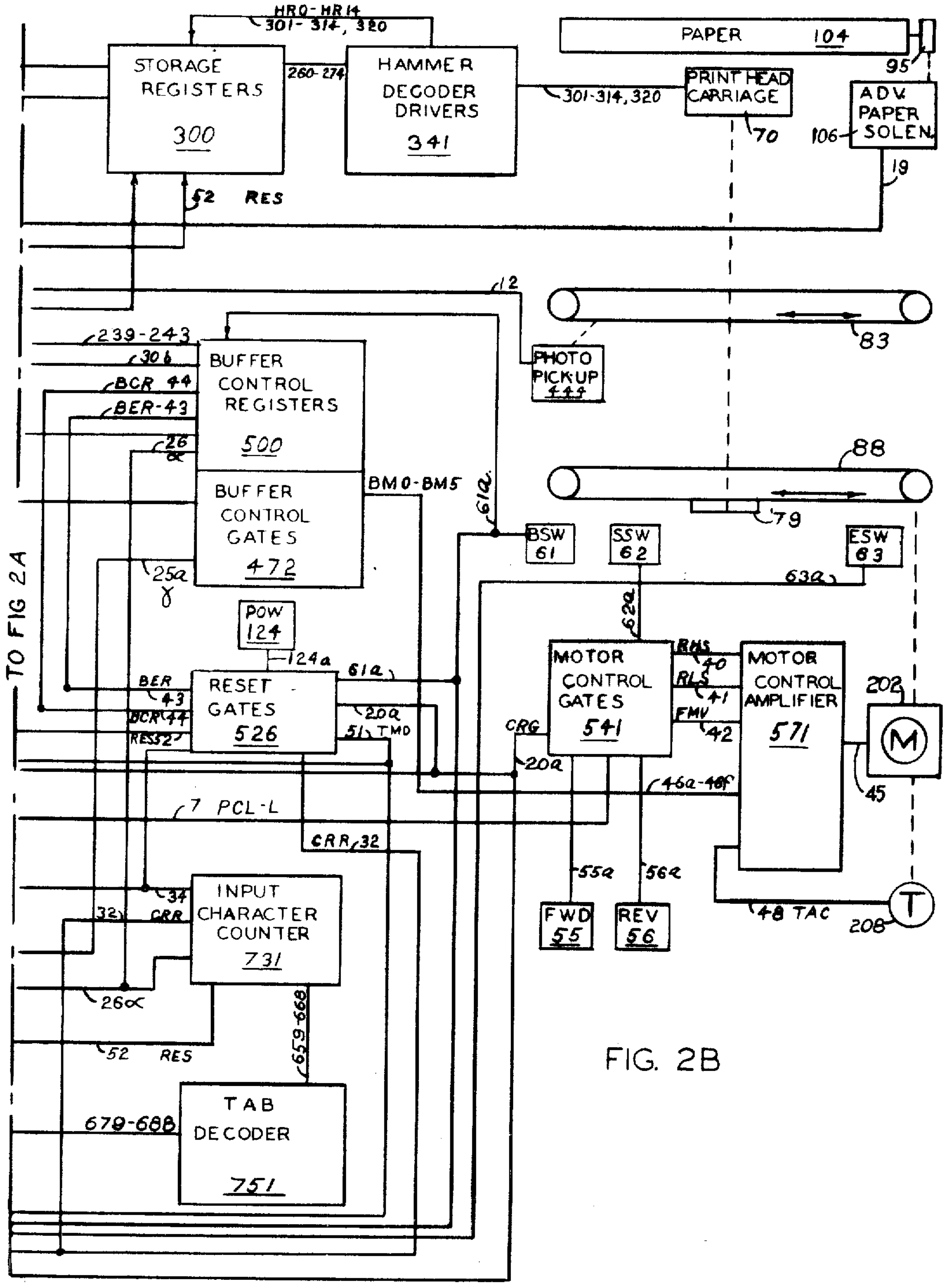

As shown in FIG. 2B, begin switch 61 is connected by line 61*a* to the buffer control registers 500. Upon actuation of the begin switch, three of the six lines BM0–BM5 to motor control amplifier 571 (as will be described in connection with FIG. 11) are turned "on." In response to the change from reverse low speed (RLS) on line 41 to a forward voltage on lines 46*a*–46*c* (FIG. 12), the direction of the carriage is changed from reverse to forward.

Actuation of the begin switch 61, as was just mentioned, during the reverse motion of the carriage sets the limit switch register "on" (FIG. 20), and this in turn initiates the forward to margin (FWM) mode by line 18 to the control pulse generator gates 641 (FIG. 13A). FWM "on" is fed also by line 18 to the feedback gates 600 which maintain the printer busy signals on line 127

$$(PCL\text{–}R=\text{"0"})$$

to the transmitter, and line 7 ($PCL\text{–}L=$"0") to the gates of the control pulse generator.

In the forward to margin mode, the carriage is brought to a reference position determined by the first P-pulse. The control pulse generator 640, in response to the first P-pulse, generates alpha and gamma pulses which function as spacing pulses, and the carriage is driven forward. Assuming that the tab panel switches 781 are set so as to locate the programmed start position or begin margin in the position such that printing can start in the first columnar space of the print line on the chart, the first gamma pulse generated by the control pulse generator serves to bring the carriage to rest in the desired position. It will be noted that the position of the begin switch 61 is selected far enough to the left of all possible programmed start positions or begin margins so that the carriage, when brought to any programmed start position, is always to the right of the begin switch 61. Thus, actuation of the begin switch always occurs at the start or during the forward to margin mode and cannot interfere with normal operation.

In the event the programmed begin margin is set by the tab panel switches to start the printing some spaces in from the first columnar space, then the generation of alpha and gamma pulses by the control pulse generator will continue until the desired count is reached by the input character counter 731 (FIG. 15). As was pointed out in connection with the carriage return mode, the gamma bar pulse associated with the last alpha pulse making up the desired count results in termination of the generation of pulses by the control pulse generator, and the carriage is brought to rest in the desired start position.

The system is now in condition to accept further character signals or commands.

In addition to the enter command (ENTR) line 14, there are three command input lines from the transmitter to the printer. These are designated: the return carriage command (RETR) which, when activated, will return the printing carriage to the preset left-hand margin which determines the programmed start position of the carriage, the advance paper command (ADVR) which, when activated, will advance the chart paper vertically one line, and the tabular command (TABR) which, when activated, will advance the carriage horizontally to the right to a preset tabular location. The printer accepts the input commands serially, that is to say, one after the other. Each command input consists of one bit. The "R" on the code symbols of ENTR, RETR, ADVR and TABR as used herein stand for "remote" to distinguish the signals from the remote transmitters from the local pushbuttons for TAB, ADVL, etc., and from the control pulse generator commands RET and ENT.

The logic levels as used in this system are such that a logical "1" is equal to zero volts plus or minus 0.6 volt, and a logical "0" is equal to minus 12 volts plus or minus 3 volts. In general here, a line is called "activated" or in the "on" condition when it is at the logical "1" or zero voltage condition. Similarly, a line is considered in the "off" condition when it is at the logical "0" or is minus 12 volts.

On the front panel of the printer there are located a series of switch controls as follows: an "on/off" power switch POW for turning power off or on to the printer; a forward switch FWD for driving the printing carriage head to the right for manual positioning; a reverse switch REV for driving the printhead to the left for manual positioning; a tab switch TAB which will advance the printhead carriage to the next preset tabular position; a paper advance switch ADV for manually permitting control of vertical paper spacing; a remote/local switch whereby the remote mode permits control of the printer from a remotely located transmitter over lines 1*a–e* and 13–16; and the local mode allows the operator to control the above functions locally from the front panel controls. It is to be understood that by "remote" transmitter it is intended to bring out that the transmitter is external to the printer and may be physically located nearby or at a great distance. Furthermore, the lines connecting the printer and transmitter may include a radio link.

Internal controls are located within the chassis of the printer and constitute adjustable controls for: hammer-strike duration; adjustments for presetting the margin positions and tabular positions; a speed adjustment for return of the printhead; positioning and tension adjustments for the drive tape idler wheels; and a return with paper advance switch (RPA) for automatically advancing the paper during each return of the printhead carriage.

It will be seen that the entire system referred to as the "printer" comprises a number of sub-systems, each of which has one or more particular functions to perform, and which cooperate to provide the desired performance of the printer.

In order that the system may be more fully understood, it will now be described in greater detail in connection with the illustrative embodiment of a preferred printer although, as will be made evident, the control system of the present invention may be used to control other and widely different mechanical operations.

Buffer gates and registers 230

Figure 6:
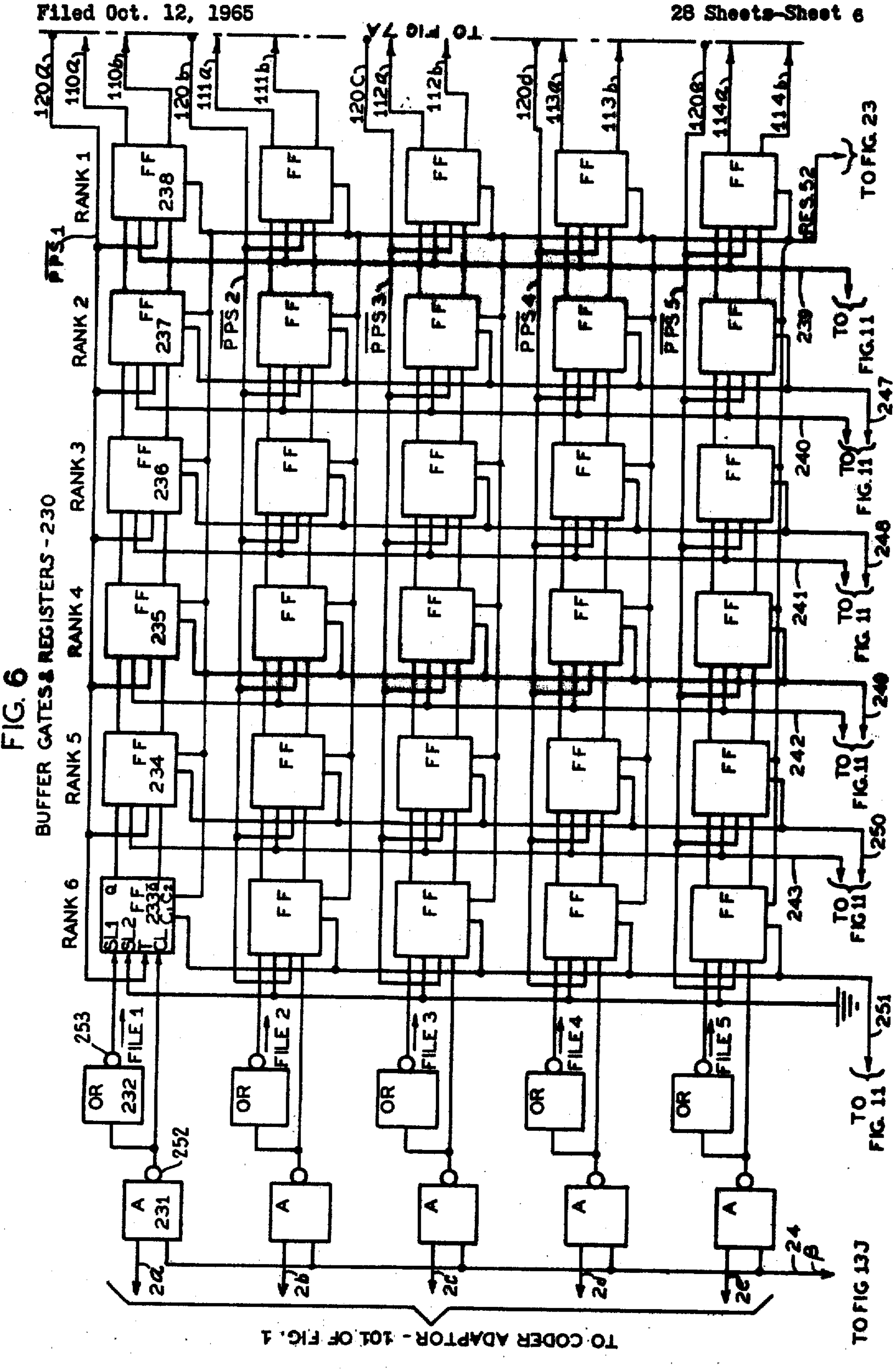
FIG. 6 is a diagram of the buffer registers and buffer input gates.

As was described, the five bits which comprise the character information signal enter the five lines 1*a* through 1*e* and are fed through coder adaptor 101 (whose function will be described later), and lines 2*a*–2*e* to the gates of the buffer gates and registers 230. As shown in FIG. 6, each input line 2*a*–2*e* feeds an AND module (designated by the letter A) which feeds an OR module. For example, input line 2*a* passes through AND module 231 which has associated with it an inverter designated by a circle, as indicated at 252. As is well know in the art, such a combination of an AND module or gate with an inverter constitutes a NAND module. The output of this NAND module is fed to OR gate 232, which also has associated with it an inverter as indicated by the circle 253. As is also well known, the combination of OR module and inverter constitutes a NOR module. Hereinafter, AND gates, OR gates, etc., that are associated with an inverter as indicated in the drawing by a juxtaposed circle on their respective output sides will be referred to by their inverted function, e.g., NAND, NOR, etc.

There is a two gate input circuit comprising the NAND and NOR gates shown at the beginning of each of the five files 1–5. Each of the NAND gates has a second input, all five of which are connected to line 24 for receiving beta pulses from the control pulse generator 640 and these gates transfer an input character binary code bit to the first buffer register in its file when a beta pulse occurs on line 24.

Each of the five files also comprises a series of six registers as indicated at 233, 234, 235, 236, 237 and 238 for file 1. This array of thirty registers has been arranged in vertically extending sets of five, called a "rank" for convenience, and numbered 1–6 from right to left as viewed in FIG. 6. Thus, the register in file 1, rank 6, is register 233.

Each of the buffer registers as indicated in connection with register 233 is a type flip-flop known as a double set shift register. It has five inputs designated as (1) set level one (SL1), (2) set level two (SL2), (3) trigger input (T), (4) clear level input (CL) and (5) two clearing resets (C1, C2). Each register also has two output lines designated as Q and $\overline{Q}$ of which $\overline{Q}$ is always the complement of Q. This type of register is operated in two different conditions: (1) with its set level two equal to logical "1" so that when the clear level is equal to logical "0," and with the trigger being held at either logical "1" or logical "0," the transition of SL1 from logical "0" to logical "1" results in Q being "1" and the $\overline{Q}$ being "0"; and (2) that in which the set level two is equal to a logical "0," in which case the flip-flop operates as a shift register. The five shift registers of a given rank are operated together in one or the other of these two conditions. The SL2 or second set level of the registers in ranks 1 through 5 are controlled by lines 239 through 243 from the buffer control registers 500. These lines are labelled $\overline{BG1}$ through $\overline{BG5}$ in FIG. 2A. The SL1 input of each of the registers in rank 6 is connected to the output of the NOR gate in its file, and the SL1 input of each register in the succeeding ranks 5 through 1 is connected to the Q output of the corresponding register in the preceding rank. The SL2 inputs of the registers in rank 6 are connected to ground as indicated to provide a fixed logical "1" input. The trigger (T) inputs of the registers in each of the files 1 through 5 are connected together and to lines 120*a*–120*e*, respectively. These lines 120*a*–120*e* are designated $\overline{PPS1}$ through $\overline{PPS5}$, respectively. The clear level (CL) input of each of the registers in rank 6 is connected to the NAND gate output in its file. The CL input of each of the succeeding ranks 5 through 1 is connected to the $\overline{Q}$ output of the next preceding register in its file. The clear reset C1 to the flip-flop registers in ranks 2 through 6 are controlled by lines 247 through 251 from the buffer control gates 472. These lines 247 to 251 are labelled RP1 through RP5. The clear reset C2 of all of the registers in ranks 6 through 1 are connected together and to line 52 labelled RES for a purpose to be described.

The lines 110*a*–114*a* connect the Q outputs of the rank 1 registers to the set level inputs of the corresponding registers making up the first rank, rank zero, of the storage registers 300. The lines 110*b*–114*b* connect the $\overline{Q}$ outputs of the registers in rank 1 to the clear level inputs of the corresponding registers in rank zero of the storage registers 300.

At start up and also at any other time during operation when all of the six ranks of the buffer registers are empty, they are in condition (1) of their aforementioned two conditions because lines 239–243 from the buffer control registers 500 are on, and, as was pointed out, the set level 2 inputs of rank 6 are fixed at logical "1" or on. When the five bits making up a character signal are gated to the five files with the registers in this condition, all the registers in any file receiving a "1" bit (*SL*1=logical "1" and *CL*=logical "0"), the bit cascades down through all six registers in that file so that their *S*L1 inputs undergo the same transition from logical "0" to logical "1," thereby making *Q*="1" for all registers in that file. Assuming, for example, that the character signal being gated is a "3," this is represented in the adopted binary code 8–4–2–1–*U* as 0–0–1–1–0, and this character signal, on being gated into the empty buffer registers, results immediately in a transition of the Q outputs of files 2 and 3 to logical "1," and the remaining Q outputs stay at logical "0." As was pointed out, the buffer control registers 472, in response to the gamma pulse which is also associated with each received character, now apply a clearing reset pulse to the C1 inputs of all of the registers in ranks 2 through 6 over lines 247–251. The buffer register ranks 2–6 are now in condition for receiving and cascading a second character signal down to rank 2 and holding it there, assuming that, upon the receipt of the second character signal, the first character signal had not previously been shifted from rank 1 of the buffer registers to rank 0 of the storage registers. It will be noted that provision is not made for applying such a clearing reset pulse to rank 1 of the buffer registers 230 because in normal operation, information in rank 1 is held for shifting to rank 0 of storage registers 300.

As has been pointed out, the enter command associated with each character signal is converted at the control pulse generator to an alpha pulse, a beta pulse and a gamma pulse, and the alpha pulses are fed to the buffer control registers 500. As the count of alpha pulses in the buffer control registers accumulates, it will be seen that the registers of ranks 1 through 5 of the buffer registers 230 are progressively converted to the shift register condition of the two aforementioned conditions by means of the connections provided by lines 239 through 243, respectively, to the $\overline{Q}$ outputs of ranks 2 through 6 of the buffer control registers. While any one of the buffer register ranks 1–5 is in its shift register condition, it will only accept information from the preceding rank when it is operated as a shift register by the shift pulses ($\overline{PPS1–5}$). On the other hand, the registers of rank 6 are always held in the first of the two aforementioned conditions ($SL2$="1"), but this will not result in bits from the next following character signal merging with its preceding character signal because, if at any time all of the ranks of buffer register 230 are occupied, then the system is prevented from accepting additional character signals.

When, during operation, it is desired to clear all of the buffer registers, this is accomplished by applying a reset pulse on line 52 simultaneously to the C2 input of each of the registers.

Buffer control registers and gates

The buffer control registers 500, as shown in FIG. 11, comprise a file of six flip-flops 501 through 506, designated ranks 1 through 6 respectively, one for each of the 6 ranks in the buffer registers 230.

The buffer control registers 501–506 each has six inputs designated set level (SL), set trigger (ST), clear trigger (CT), clear level (CL), clear reset (C) and a set input (S). As before, the outputs are marked Q and its complement $\overline{Q}$. A flip-flop of this type is considered activated or "on" when $Q$="1" and inactive when $\overline{Q}$="1." In operation, a logical "1" at S activates or sets the flip-flop "on" ($Q$="1"); a "0" at S does nothing, nor does it hinder any other input function; a logical "1" at C deactivates or turns the flip-flop "off," that is $Q$="0"; a logical "0" at C does nothing, nor does it hinder or inhibit any other function; with a logical "1" at SL, a logical "0" at CL and an active going transition from "0" to "1" at ST, then the "0" to "1" transition triggers the flip-flop "on," and it stays "on" until turned "off." With a logical "1" at CL, a logical "0" at SL, and an active going transition from "0" to "1" at CT, then the "0" to "1" transition triggers the flip-flop "off."

Each incoming alpha pulse on line 26 turns "on" the lowest ranked counter or register which is not already "on." Thus, with all the registers off, the first alpha pulse will turn "on" flip-flop 501 putting line 507 (BG0) "on." The second alpha pulse on line 26 will then turn flip-flop 502 "on" so that line 508 (BG1) will be "on." The turning "on" of the successive registers constitutes a count of the alpha pulses. And unless a count is subtracted by turning "off" a register, the sixth in a succession of alpha pulses will turn on flip-flop 506 to provide BG5 "on" on line 512 to feedback gates 600, and the latter with BG5 "on" indicates inhibiting conditions which prevent the system from accepting character signals.

As shown in FIG. 11, the $\overline{Q}$ outputs of buffer control registers 502–506 are connected respectively to AND gates 492–496, each of which has two input terminals. The remaining input terminals of AND gates 492–496 are connected by line 25*a* to the gamma pulse output of the control pulse generator 640. The outputs of gates 492–496 are connected respectively to the C1 clearing reset inputs of the registers in ranks 2–6 of buffer registers 230. For any one of the AND gates 492–496 to be activated to provide a logical "1" at its output requires that its input from $\overline{Q}$ of its associated control register 502–506 be equal to a logical "1" when a gamma pulse is applied to its other input. Thus, a C1 clearing reset pulse is only applied to those ranks in the buffer registers 230 whose correspondingly numbered ranks of the buffer control registers 500 are in their unactivated condition ($Q$="0" and $\overline{Q}$="1").

As is also shown in FIG. 11, the Q outputs of buffer control registers 501–506 are connected respectively to NOR gates 430–435 (only one of the input terminals of which is used) and the outputs of these NOR gates are connected by lines 46*a*–46*f* to motor control amplifier 571. As will be more fully pointed out, in the forward mode of operation, motor 202 is operated at a faster or slower rate, depending upon whether more or less of the control registers 500 are active at any given time. Thus, as a count of alpha pulses accumulates as reflected by more and more of the control registers being active at one time, the speed of carriage 70 is increased, a count of 6 (all registers "on") resulting in high speed. Furthermore, a count of zero (all registers "off") results in the motor 202 being shut down and the carriage 70 at rest.

As was already pointed out, with forward movement of the carriage 70, timing pulses (PPS="1" and $\overline{PPS}$="0" are provided, one for each columnar space advance of carriage 70 along chart 104. Operations in the system synchronized by the timing pulses are keyed to the timing pulse transitions. The $\overline{PPS}$ timing pulse on line 30*b* is applied to the CT inputs of registers 501–506 and the transition going from "0" to "1" of each $\overline{PPS}$ deactivates the highest ranked counter that is "on." If control registers 501, 502 and 503 are "on" when a $\overline{PPS}$ timing pulse is received, then $CL$="1" in register 503 and $CL$="0" in registers 501 and 502. Thus, only register 503 will be deactivated. In operation, the buffer control registers accumulate the difference in count between the input alpha pulses and the input $\overline{PPS}$ pulses.

The begin switch 61 is connected to the S inputs of control registers 501–503 to activate these three registers when the begin switch is actuated by the passage of the carriage from right to left during the carriage return mode to change the direction of motor 202 from reverse to forward. As was described hereinabove, in addition to changing the direction of operation of motor 202, this actuation of BSW 61 initiates the "forward to margin" mode of operation of the system.

Line 43 labelled BER feeds to the C inputs of the first three registers 501, 502, 503, from the reset gates 526 shown in FIG. 23. Line 44 labelled BCR feeds to the C inputs of registers 504, 505, 506 from the reset gates 526 shown in FIG. 23. As is clearly apparent in FIG. 23, the BCR reset signals occur with either the begin switch, or the CRG carriage return gate signal, or the time delay TMD signal. Also as shown in FIG. 23, the BER reset signal occurs with either the occurrence of the CRG carriage return gate signal or the TMD time delay signal.

Storage registers 300

Figure 7A:
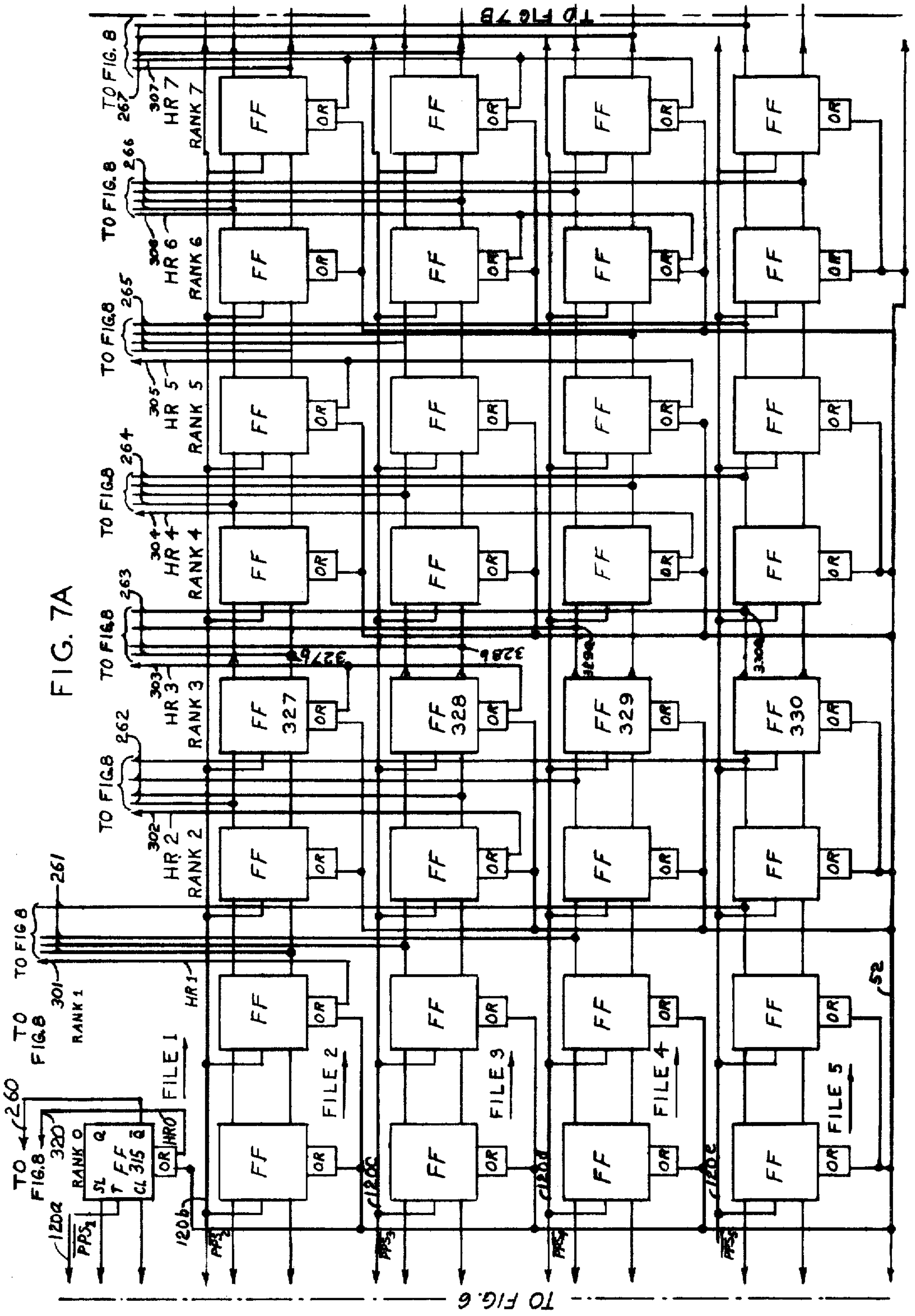
FIGS. 7A and 7B are diagrams showing the storage (shift) registers.

As was seen each of the five files of the buffer registers (FIG. 6) has a dual output, labelled 110*a* and *b* to 114*a* and *b*. Each of these output lines feeds to the corresponding file of the storage registers 300 as shown in FIG. 7A. The storage registers 300 as shown in FIGS. 7A and and 7B are composed of fifteen ranks (labelled rank 0–14) and five files (files 1–5). Because a "1" bit in the "U" digit of the "8–4–2–1–U" binary code constitute the "underline" signal independent of the information in the remaining digits, and this signal is fed along file 1 and printed out from rank 0, file 1 need only consist of one register. This is illustrated in FIG. 7C, where the numbers 0–14 in the left column of the chart correspond to the ranks of the storage registers and the remaining columns, designated "8–4–2–1–U," correspond respectively to files 5, 4, 3, 2 and 1. The ranks 0–14 of the storage registers 300 respectively are associated through the hammer decoder drivers 341 with the character carried by a particular hammer as follows (the hammers being arranged in the same order in which they are mounted on the carriage 70):

| | | | | | | | | | | | | | | | |
|---|---|---|---|---|---|---|---|---|---|---|---|---|---|---|---|
| Char | — | 1 | 2 | 3 | 4 | 5 | 6 | 7 | 8 | 9 | 0 | + | — | . | : |
| Rank | 0 | 1 | 2 | 3 | 4 | 5 | 6 | 7 | 8 | 9 | 10 | 11 | 12 | 13 | 14 |

Figure 7B:
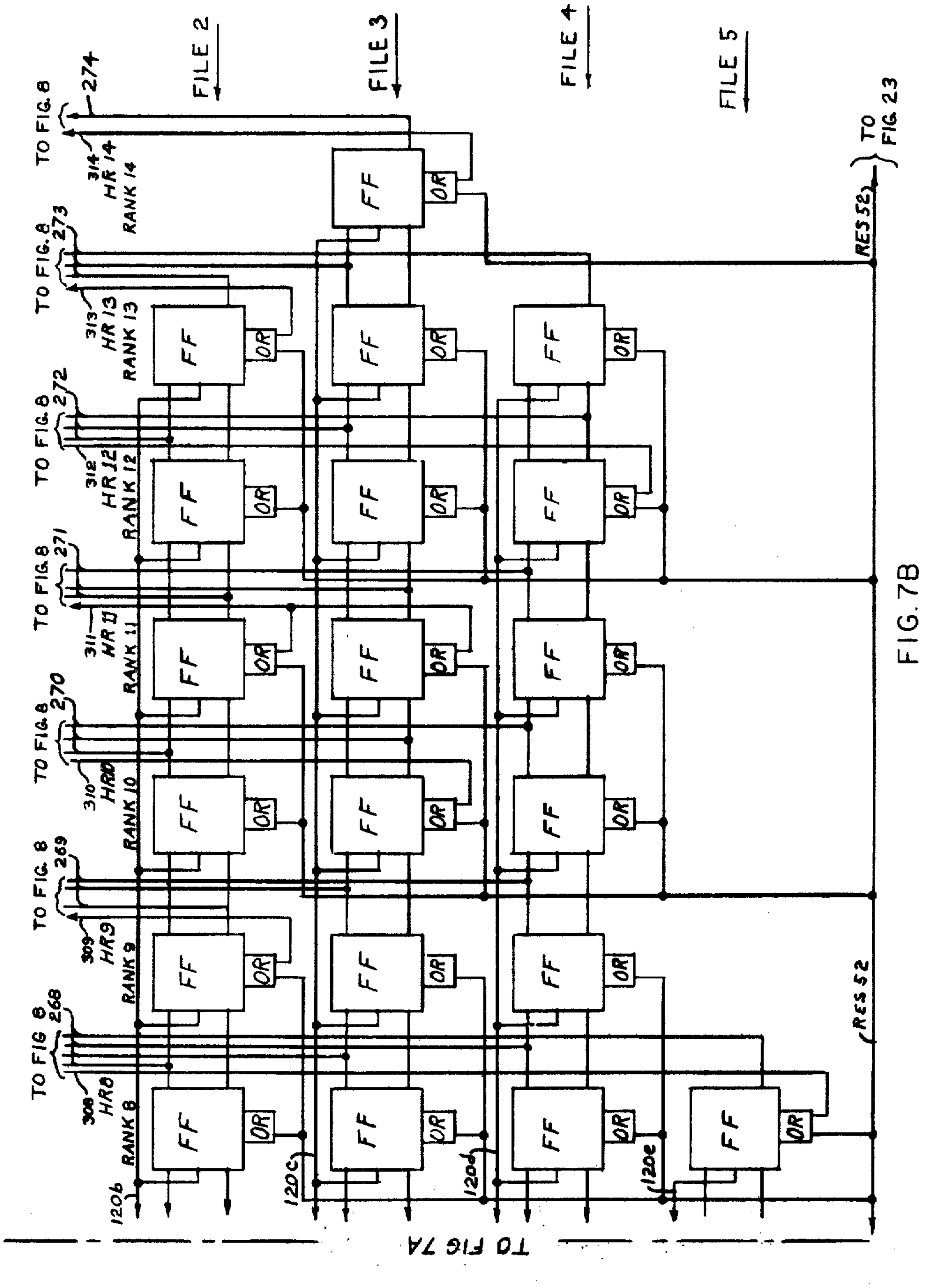

As shown in connection with register 315 (FIG. 7A, rank 0, file 1), each of the storage registers is operated as a flip-flop having a set level input (SL), a trigger input (T), a clear level input (CL) and a special clearing reset input derived from an associated OR gate. As shown, for some of the registers (FIGS. 7A, 7B) two of the inputs to the OR gate are used, and in the remaining instances only one of the inputs is used. The outputs are designated Q for the active output and $\overline{Q}$ for its complementary output.

The timing or P-pulses for shifting character bit information from one rank to the next in synchronism with the motion of the printhead carriage 70 across the paper chart 104 are provided by lines 110*a* through 110*e*. As in the case of the buffer registers 230 aind buffer control registers 500, the effective portion of the $\overline{PPS}$ pulses is their second transition, from "0" to "1." It is the occurrence of that transition at the trigger inputs of the registers which serves to shift the character information from rank 1 of the buffer registers to rank 0 of the storage registers. The input lines 301 through 314 and 320 labelled HR0 through HR14, respectively, are for the purpose of clearing the registers upon printout of a given character signal.

Line 52 is the system reset input to the registers to put all registers in a preset condition at the start of a new line or upon turning on power. This line 52 comes from the reset gates of FIG. 23.

Figure 8:
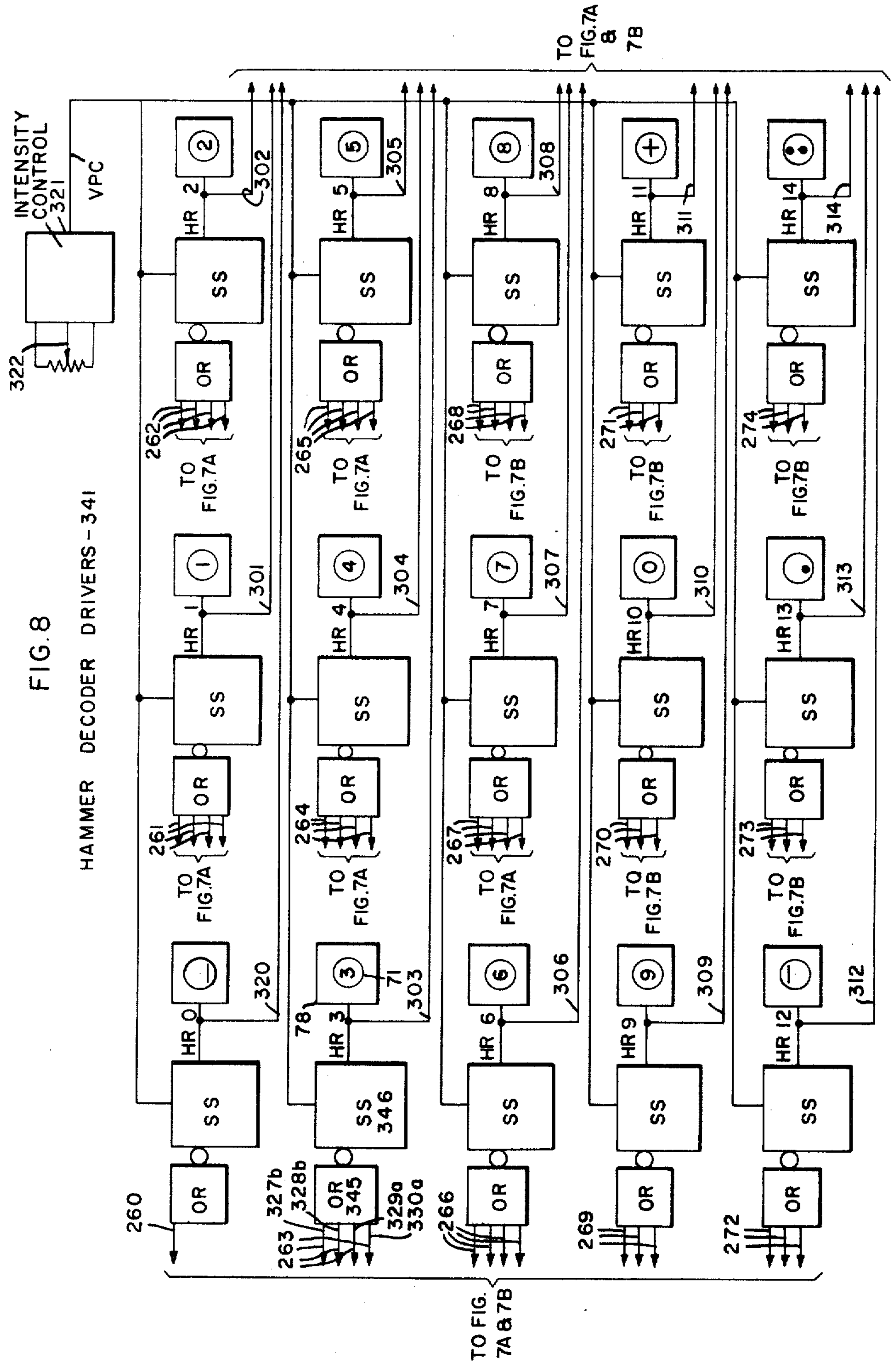
FIG. 8 is a diagram showing the hammer decoder-drivers.

The outputs of the storage registers 300 are connected rank by rank to a particular gated input of the hammer decoder drivers 341 (FIG. 8). For this purpose, cables 260 through 274 are connected respectively to the outputs of the registers in storage register ranks 0–14. In each rank, the connections at the outputs of the register in a given file is made so as to carry the significant information which, together with that from the remaining files of the rank, serves to identify the character signal and only that character signal of the print hammer associated with that rank. The chart of FIG. 7C shows in the "8–4–2–1–U" binary code for each rank, those bits which, when present in that rank will result in its print hammer being actuated. Thus, when, for example, a "1" is present in register 315 (rank 1, file 1), it will result in the actuation of the "underline" character hammer. It will be noted that the output of register 315 is taken from $\overline{Q}$, Q being equal to "1."

As will be pointed out in connection with FIG. 8, the input gates of the hammer decoder drivers 341 are NOR gates from each of which it is desired to obtain a logical "1" output. Consequently, cables 260–274 are connected to the register outputs of their respective ranks so that all of the lines of each cable are in the logical "0" condition when the desired character signal is in its rank. Thus, only rank 3 will provide a logical "0" on all lines of its cable 263 for the binary code which identifies decimal 3. This condition is obtained for rank 3 by connecting cable lines 327*b* and 328*b* to the $\overline{Q}$ outputs of registers 327 and 328, respectively, and by connecting lines 329*a* and 330*a* to the Q outputs of registers 329 and 330.

To clear a rank whose hammer is being actuated, it is only necessary to reset those registers in that rank which are in the "on" condition. Reset pulses HR0–HR14 are fed on lines 320 and 301–314 to the ranks 0–14, respectively, and the reset line for each rank is connected to the OR gate clearing reset input of those registers in the "on" condition in that rank when that rank's hammer is being actuated.

Hammer decoder drivers 341

In FIG. 8, the electromagnetic coil 78 of each print hammer is represented by a box as indicated at 78, and each print hammer 71 is represented by a circle within the box, the character of the hammer being shown within the circle.

The hammer decoder drivers 341 (FIG. 8) comprise fifteen single shot modules (SS), the output of each of which is fed to the associated print hammer 71 to actuate the same. Each of the fifteen single shot modules is fed by a NOR gate, and these NOR gates are connected by cables 260–274 to ranks 0–14, respectively, of the storage register 300. The reset lines 320 and 301–314 for the ranks 0–14, respectively, are connected to the respective single shot outputs as shown, so that when a hammer electromagnet receives a pulse, the same pulse is simultaneously used as a reset pulse for that hammer's storage register rank.

The single shot circuit used here is basically a monostable multivibrator whose pulses are determined by the network RC time constant. In FIG. 8, the duration of the single shot pulse width can be varied by intensity control 321 and potentiometer 322 to control the duration of the pulse, and thus regulate the intensity of the imprint made by the print hammer against the print ribbon and chart paper.

Printout occurs at the trailing end or second transition of the timing or P-pulse, because it is that transition of the timing pulse which causes the information to shift from a given register to the next. As a character signal shifts into its uniquely coded rank, it is instantaneously decoded and printed out by the appropriate print hammer. The turn "on" of a single shot circuit for its character printout also serves at the same time to clear the corresponding rank of the storage register 300.

Timing (P-pulse) generator 451 and photo pickup 444

The timing pulse generator 451 (FIG. 9A) is fed, on cable 12, the output of the photo pickup 444 (FIG. 9A and FIGS. 10A–10D). The photo pickup has two light sources 445 and 446 which are continuously on. In direct confronting alignment with light sources 445 and 446, are phototransistors 447 and 448, respectively. Type OCP–70 phototransistors are suitable for this purpose. The mutual position and arrangement of the two phototransistors and the apertures 84 in the timing tape 83 is such that only one phototransistor can be activated at any given moment by the coincidence of a tape hole with the light path between the light source and phototransistor. This can be done by having the distance between the phototransistors 447 and 448 (also between the light sources 445 and 446) equal to $(n+\frac{1}{2})d$, with $n$ equal to zero or a whole number, and $d$ equal to the distance between adjacent apertures 84. As shown for illustrative purposes, $n$ equals 3.

Phototransistors 447 and 448, together with flip-flop 452 (FIG. 9A) function as an "on/off" switch. The arrangement is such that phototransistor 448 when illuminated turns the flip-flop "off" and phototransistor 447 when illuminated turns the flip-flop "on." Thus, as shown in FIG. 10A with the unapertured portion of tape 83 between the phototransistors and the light sources, both phototransistors are inactive. As will be pointed out in connection with FIG. 9A, flip-flop 452 will be in its closed or "off" condition. Continued movement of tape 83 brings the first hole 84 into coincidence with light source 446 and phototransistor 448 as shown in FIG. 10B. This actuation of phototransistor 448 has no effect because flip-flop 452 is already "off." Similarly, passage of the second and third holes between light source 446 and phototransistor 448 has no effect upon the condition of flip-flop 452. As shown in FIG. 10C, continued movement of tape 83 brings the first hole into coincidence with light source 445 and phototransistor 447, actuating the latter, and flip-flop 452 is thereby turned "on." It is apparent from FIGS. 10C and 10D that tape movement of an amount equal to one-half the distance between the leading edges of the holes, to the left, will first bring a hole into coincidence with phototransistor 448 and its light source, at which time phototransistor 447 will have been blocked by the tape from its light source. A further tape movement of an equal amount next brings a hole into coincidence with phototransistor 447 and its light source, at which time phototransistor 448 will have been blocked by the tape from its light source. This alternating actuation of the phototransistors continues with and at a rate determined by the movement of the tape 83 as the carriage is driven in its forward direction. And this results in flip-flop 452 being turned "on" and "off" simultaneously with and at the same rate as phototransistors 447 and 448 are alternately actuated.

Figure 9A:
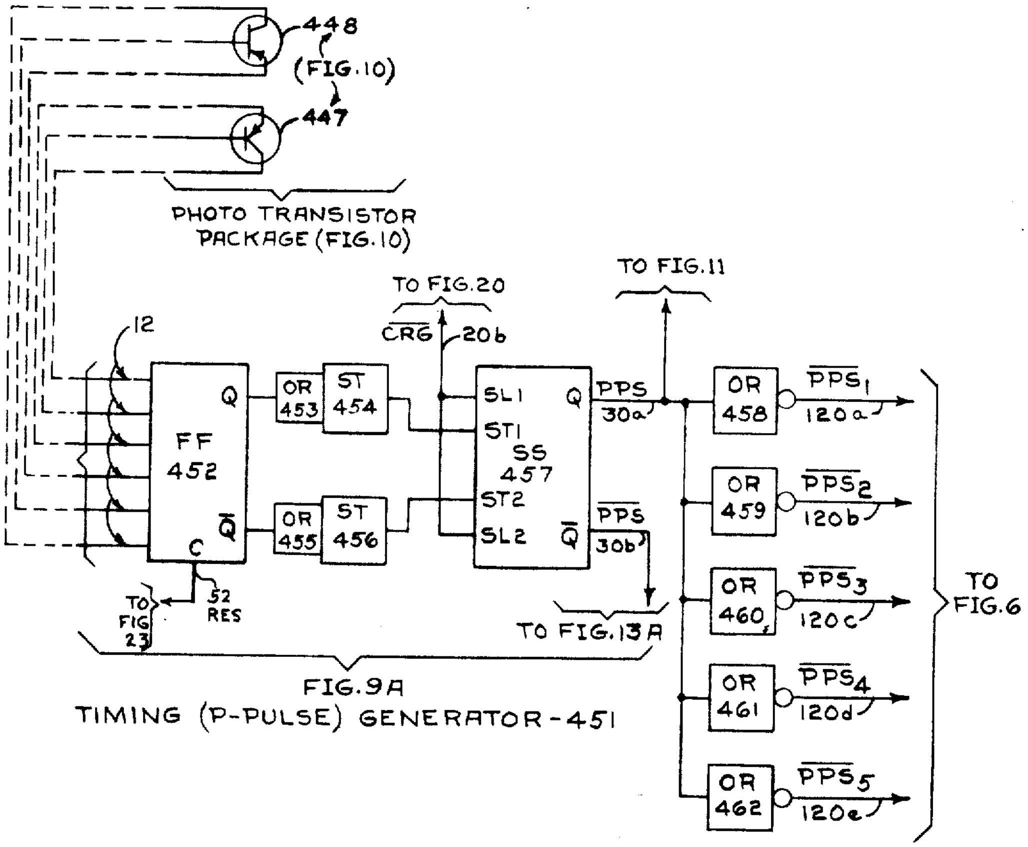
FIG. 9A is a diagram showing the timing or P-pulse generator.
Figure 10A:
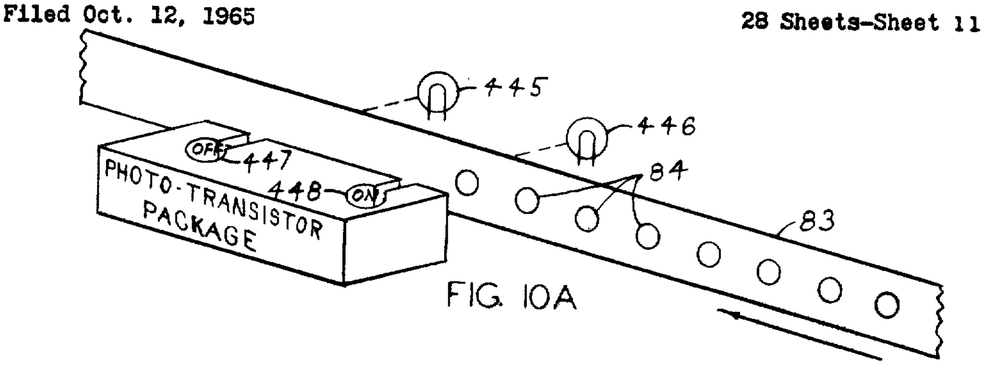
Figure 10B:
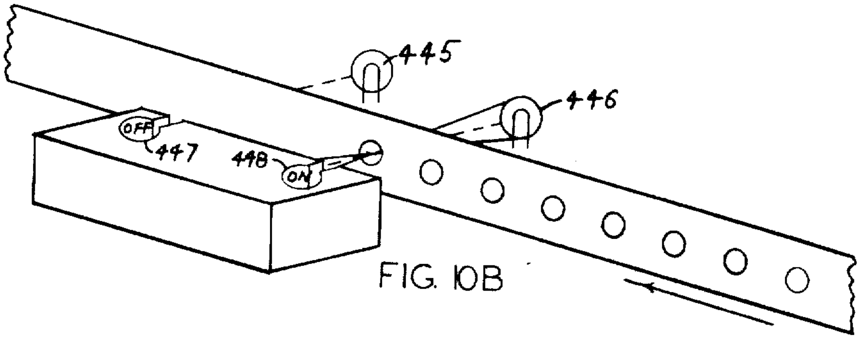
Figure 10C:
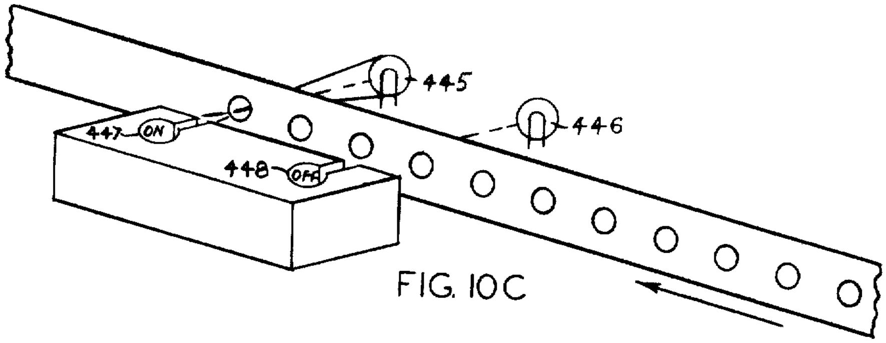
Figure 10D:
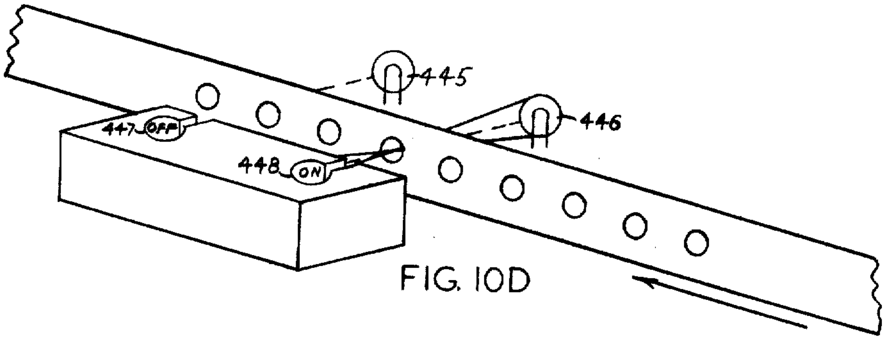

Referring now to FIG. 9A, the timing generator 451 is a source of timing pulses (PPS, $\overline{PPS}$) which are used to identify the position of the print carriage 70 with respect to the chart 104 as referred to a starting position established by the first hole in tape 83 and to synchronize the location of the character signals in the buffer and storage registers with respect to the position of the carriage. The leading edge of each P-pulse, which coincides with the turning on of FF 452, by the connection of the timing tape 83 to the print carriage, provides a precisely timed indication of the completion of each increment of the advance of the carriage from said starting position. A combination OR gate 453 and Schmitt trigger 454 is used to condition and sharpen the Q output from FF 452. Similarly OR gate 455 and Schmitt trigger 456 are used to shape the $\overline{Q}$ output from FF 452. The outputs of Schmitt triggers 454 and 456 are fed to the first and second set trigger inputs respectively of single shot (SS) 457. The single shot 457 produces a pulse for each positive going transition received either at ST1 or ST2 as long as the carriage return gate flip-flop is "off," that is $\overline{CRG}$="1." The output of the single shot 457 is a pulse whose duration is 0.5 millisecond, Q being designated PPS, $\overline{Q}$ being designated $\overline{PPS}$. One pulse is generated for each light hole coincidence with each phototransistor. Because there ore two phototransistors in the aforementioned spatial relationship, each hole is used to generate two P-pulses. This is advantageously used in providing a durable, accurately perforated tape, by making it possible to use one-half as many holes as there columnar spaces along a print line on the chart 104. To this end. the distance between the leading edges of the adjacent holes 84 is made equal to twice the width of a single columnar space.

Figure 9B:
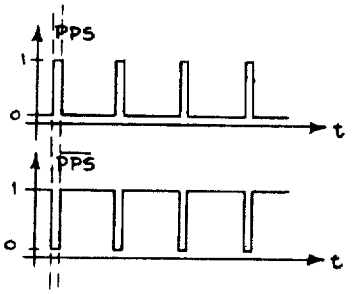
FIG. 9B is a diagram showing the time relationship of the timing generator pulses.

PPS on line 30*a* is fed to five NOR gates 458 to 462 to provide for higher current output requirements than could be provided for by the $\overline{Q}$ output of SS 457. The outputs 120*a* through 120*e* of the NOR gates are designated $\overline{PPS1}$ through $\overline{PPS5}$. These pulses are the inversion of the PPS pulse on line 30*a* and their waveforms are shown in FIG. 9B. The trailing or second transition of each $\overline{PPS}$ and $\overline{PPS1}$ through $\overline{PPS5}$ is a positive going transition. It may be noted that the first transitions of the PPS and $\overline{PPS}$ are initiated by changes from "0" to "1" of the Q and $\overline{Q}$ outputs of FF 452. However, the second transition of PPS and $\overline{PPS}$, which determines the length of the pulses, is initiated internally by SS 457 and depends upon the internal parameters selected.

Motor control gates and amplifier

Referring to FIG. 12, motor control gates 541 comprise a NAND gate 572 fed from the manual forward switch 55 (FWD) and by hte PCL–L line 7 from the feedback gates 600. The output of the NAND gate 572 is designated FMV (forward motor voltage) on line 42. This gate provides FMV to the motor control amplifier 573 when the FWD button switch 55 (FIG. 19) on the front of the printer is actuated to call for forward motor voltage, with the printer in its clear condition (*PCL–L*=logical "1"), and remote/local switch 60 shifted to its local contact.

Reverse switch 56 (REV) on line 56*a* and PCL–L (printer clear local signal) on line 7 are connected to the input of AND gate 542. The output of AND gate 542 feeds OR gate 543 which is also fed from the CRG or carriage return gates signal line 20*a*. The slow down switch (SSW) 62 on line 62*a* feeds to NOR gate 544, and its output goes to both the set and clear triggers of flip-flop 546. The output of OR gate 543 to fed to NOR gate 545, to the clear level input of flip-flop 546 and to NAND gates 547 and 548. The output ($\overline{RMV}$) of NOR gate 545 is fed to the set level input of flip-flop 546. The time delay (TMD) signal on line 51 is fed to the clearing reset (C) input of flip-flop 546. The Q and $\overline{Q}$ outputs of the flip-flop 546 are fed respectively to NAND gate 547 and NAND gate 548 whose outputs are designated, rsepectively, RHS on line 40 for reverse direction high speed signal and on lien 41 RLS for reverse direction low speed signal. These outputs are fed to amplifier 574 of the motor control amplifiers 571.

Thus, a reverse speed voltage is fed to the motor 202 (through the motor control amplifiers 571) when

*REV*="1"

and *PCL–L*="1," that is, when a reverse signal is generated by actuation of switch 55 and the printer is clear; or when, the printer being clear, *CRG*="1" on line 20*a*. In either case, RMV will equal "1." Upon a demand for reverse speed, whether reverse low or high speed operation is provided depends, respectively, upon whether flip-flop 546 is "off" or "on." To provide the desired operation, slow speed switch 62 is so arranged that when the reverse motor voltage is called for upon the termination of a forward cycle, the motor will be driven in reverse at high or low speed depending upon whether the carriage is to the right or left of the slow speed switch 62 as viewed in FIG. 4A. Except for very short excursions of the carriage in the forward direction, the slow speed switch is so located that it is actuated by the carriage in its forward movement, and, when so actuated, the switch resets flip-flop 546 to its "on" condition. This provides reverse high speed operation when RMV next becomes equal to "1." The flip-flop 546 is turned "off" when the print carriage 70, while moving in the reverse direction, actuates the slow speed switch (SSW) 62.

Also, flip-flop 546 is cleared by the time delay TMD) signal on line 51. The time delay signal is generated when the power on switch 124 is actuated.

The motor control amplifiers 571 provide the current and voltage to drive motor 202 at the desired speed and in the desired direction. As was pointed out in connection with FIG. 11, the number of buffer control registers 501–506 that are "on" reflects the number of character signals being stored in the buffer registers 230, and, depending upon whether all of the buffer control registers are "off" or whether one or more are "on," the motor is "off" or is operated in the forward direction at a speed proportional to the number of registers that are "on." To this end, the Q outputs of the buffer control registers are fed throughout NOR gates 430–435, on lines 46*a* through 46*f* (BM0 to BM5) to the input of summing amplifier 573. Also the FMV or forward motor voltage on line 42 from the motor control AND gate 572 is fed to amplifier 573. The output of amplifier 573 is inverted and fed to summing amplifier 574. The reverse high speed signal and the reverse low speed signal on lines 40 and 41 from the motor control NAND gate 547 and 548 are also fed to amplifier 574. Additionally, there are fed to amplifier 574 a bias signal from potentiometer 578 and a tachometer voltage signal on line 48 from tachometer 208. The potentiometer 578 provides adjustment of the motor control loop to compensate for minor variations in performance. The output of amplifier 574 is inverted and fed to voltage amplifier 576, again inverted, fed to current amplifier 577 and then fed on line 45 to drive motor 202. The drive motor is mechanically linked to tachometer 208 which generates a voltage that is fed back to amplifier 574 on line 48. The voltage generated by tachometer 208 is directly proportional to the speed of the motor. The amplifiers 574, 576 and 577, together with motor 202 and tachometer 208, are linked in a velocity controlled servo loop.

Referring to FIG. 19, a group of control switches are provided on the front panel of the printer and also internally, the switches being connected across a D.C. power supply as shown. Each circuit leg has a current limiting resistor as indicated at 913. The remote/local switch 60 and the four pushbutton momentary switches 55, 56, 57 and 58 are located on the front panel console. It will be noted that the remote/local switch 60 must be in the "local" position to complete the circuit to ground when the siwtches FWD 55, REV 56, TABL 57 and ADV 58 are actuated. The three magnetic reed relay switches BSW 61, SSW 62 and ESW 63 are located as most clearly shown in FIG. 4B. Switch 21 labelled FBD is the feedback "off-on" switch which is further described in connection with the tab gates circiut 800 (FIG. 18A). Switch 39, labelled RPA, is the return with paper advance switch, which when activated in the "on" position automatically provides for a paper advance with each carriage return.

Control pulse generator 640

The control pulse generator 640 comprises gates 641 (FIG. 13A), long pulse generator 676 (FIG. 13C), delay pulse generator 691 (FIG. 13F), short pulse generator 700 (FIG. 13H) and short pulse generator gates 716 (FIG. 13J).

Referring to FIG. 13A, the control pulse generator gates 641 comprise: NAND gate 642 fed by the timing or P-pulse signal PPS on line 30*a* and the FWM or forward to margin signal on line 18 from the limit switch registers 841 (FIG. 20). NAND gate 643 fed by the remote tabular command TABR on line 15, the remote switch 60 on line 60*a*, and PCL–L or printer clear line 7 from feedback gates 600 (FIG. 22). NAND gate 644 fed by the local tabular switch TABL on line 57*a*, by local switch 60 on line 60*b*, and the PCL–L or printer clear line 7. AND gate 645 is fed by the enter command (ENTR) line 14 from the remote transmitter and by line 60*a* from the remote contacts of the remote/local switch 60. AND gate 647 fed by the RETR or return carriage command line 16 from the remote transmitter and by line 60*a* from the remote contacts of switch 60.

The outputs of NAND gates 642, 643 and 644 are fed to AND gate 649 which is combined with Schmitt trigger 650. The output of Schmitt trigger 650 feeds NAND gate 653.

AND gate 645 is combined with Schmitt trigger 646 and the output of the latter is fed to flip-flop 651 at its set trigger input. This flip-flop is also fed at its set level by the PCL–L or printer clear signal line 7 and at its clear trigger input by the $\overline{LPG}$ line 65. Flip-flop 651 is also fed by the CRR or carriage return reset signal on line 32. The Q output line 35 of FF 651 is designated ENT (character enter mode). The $\overline{Q}$ output of FF 651 designated $\overline{ENT}$ is fed to NAND gate 653. Schmitt trigger 648, which is combined with AND gate 647, feeds to the first set trigger input of single shot 652 whose first set level input is from the PCL–L line 7. Single shot 652 is also fed by line 31, the TCR or tab carriage return line from tab gates 800. The Q output of single shot 652 is designated RET (return mode) on line 34. The $\overline{Q}$ output is designated $\overline{RET}$, and is fed to NAND gate 653. The output of NAND gate 653 on line 64 is designated GNT.

The control pulse generator gate GNT output provides a pulse to activate the long pulse generator 676 under the following conditions:

(1) If the position sensing switch BSW 61 has been actuated so that the print carriage 70 is in the forward to margin mode (by the activation of flip-flop 850 of limit switch registers 841 as shown in FIG. 20), and if the first timing or P-pulse (PPS) is received from the timing generator 451, then a pulse is generated at line 64 GNT which turns on the long pulse generator 676 and continues the program in the TAB mode, searching for the begin margin. The tab mode signifies that a tab signal has been activated either from the remote transmitter (TABR) or from the local tab button (TABL). Immediately that this is done, the system will stop accepting characters and move to the next preset tabular margin location printing out characters as required.

(2) If a remote tab (TABR) command is received on line 15 and the remote/local switch 60 is in its remote position and the printer is clear (*PCL–L*="1"), then a GNT pulse will be generated on line 64 to turn on the long pulse generator 676 and start the TAB mode.

(3) If a local tab command (TABL) is received on line 57*a*, the remote/local switch 60 is in its local position and the printer is clear (*PCL–L*="1"), then a GNT pulse will be generated on line 64 which activates the long pulse generator 676 and starts the TAB mode.

(4) If an enter command (ENTR pulse) is received from the remote transmitter on line 14 and the remote/local switch 60 is in its remote position, then the ENT flip-flop 651 of FIG. 13A is activated, generating a pulse to the long puse generator via GNT line 64 which turns on the long pulse generator and begins the ENT mode. The ENT mode means that the printer is clear to accept input information and the input character signal information may be accepted due to the presence of an enter command pulse signal, ENTR, on line 14. It also means that digital character signals are entering the buffer gates and registers, and that the control pulse generator 640 is generating alpha, beta and gamma pulse control signals. The ENT mode for a given character signal is terminated by its $\overline{LPG}$ pulse.

(5) If a return command (RETR) is received from the remote transmitter on line 16 and the remote/local switch 60 is in remote position, then the RET single shot 652 will be activated to produce a pulse on line 64 GNT which will turn on the control pulse generator and start a twenty-one cycle TAB mode. This is to ensure that all information in the fifteen storage registers and six buffer registers will have been printed out before the carriage is returned.

It will be seen that both the ENT signal on line 35 and the RET signal on line 34 will be inhibited if the printer is not clear (*PCL–L*="0") by the PCL–L command input to the set levels of flip-flop 651 and single shot 652. The ENT flip-flop 651 is deactivated at the end of one long pulse generator cycle by the $\overline{LPG}$ input on line 65. The RET single shot 652 is also activated by a TCR or tab carriage return input on line 31 which is a pulse generated by the tab gate 800.

The wave forms in FIG. 13B show how the begin switch 61 activates the FWM or forward to margin flip-flop 850 of the limit switch register, which, with the receipt of the first P-pulse, generates a forward to margin pulse $\overline{FMP}$ on line 53 (FIG. 13A), which activates GNT line 64 causing activation of the long pulse generator as described in condition (1) above.

As shown in FIG. 13C, the long pulse generator 676 comprises a flip-flop 677 which is fed the GNT signal on line 64 from the control pulse generator gates, the tab stop or TBS signal on line 28 from the tab gates 800, and the TBG signal on line 27 from the tab gates 800. The $\overline{Q}$ output of flip-flop 677 is interlocked with its set level input. The reset signal RES is fed on line 52 to the clearing reset input of flip-flop 677. The Q output of this flip-flop is designated LPG (long pulse gate) on line 33, and its complementary output is $\overline{LPG}$ on line 65. The LPG line 33 leads to gated oscillator 678 and to the feedback gates 600 (FIG. 22). This oscillator 678 operates such that with a logical "0" on the set gate SG, the output of the oscillator remains inactive (that is, *Q*="0"). When the set gate input changes from "0" to "1," the output then alternately switches from one level to the other as shown in FIGS. 13D and 13E.

The outputs of the oscillator 678 are designated LPC (long pulse clock) on line 38 and $\overline{LPC}$ on line 138.

Thus, the long pulse generator comprises a flip-flop and a gated oscillator whose full cycle time constant, is 13.3 milliseconds with the FED switch "on" to delay the transition of TBS from "0" to "1." The GNT input line 64 to the set trigger of flip-flop 677 will activate the flip-flop and gate the oscillator 678 "on." The oscillator 678 will continue on until the TBG input on line 27 is at the "1" level and a TBS trigger on line 28 clears the LPG flip-flop 677. The LPG flip-flop 677 then will shut the oscillator 678 "off."

FIG. 13D and FIG. 13E show pulse relationships when the ENTR command pulse activates the long pulse generator and (1) the feedback delay switch (FBD) 21 is "off," and (2) the feedback delay switch FBD is "on." The net effect is that when the feedback delay switch is "off" the long pulse generator's cycle (LPG) is terminated after 0.4 millisecond and, in the condition when the FBD feedback delay switch is "on," one cycle of the long pulse generator (*LPG*="1") extends for 13.3 milliseconds.

The delay pulse generator (FIG. 13F) comprises NOR gate 693 which is fed by the PPS or P-pulse signal on line 30*a* from the timing generator 451 and by the $\overline{LPC}$ line 138 from the pulse generator. Flip-flop 692 is connected at its set trigger input to the $\overline{LPC}$ line 138 and is connected at its trigger input to the alpha pulse on line 26 from the short pulse generator gates 716. The set input of flip-flop 692 is fed by the reset RES on line 52. The output of NOR gates 693 is designated DPT (delay pulse trigger) on line 140. The Q output of flip-flop 692 is designated DPG (delay pulse gate) on line 141 and the $\overline{Q}$ output is interlocked with its set level input.

The delay pulse generator prevents the coincidence of an enter command (ENTR) signal and the P-pulse (PPS) from simultaneously activating circuits which are common to the two pulses. The entering of information into a register at the same time information is shifted out of the register would result in an indeterminate output.

The pulse diagram of FIG. 13G shows the delaying effect of the delay pulse generator when the LPC pulse is activated by an ENTR command signal and a P-pulse PPS began slightly prior to this ENTR command. The net result of this is that the short pulse generator 700 is activated at the end of the P-pulse.

The short pulse generator 700, FIG. 13H, comprises flip-flop 701, gated oscillator 704, and flip-flop 707. Flip-flop 701 is fed by the DPG signal on line 141 and the DPT signal on line 140 from the delay pulse generator just described. The Q output of flip-flop 701 is designated MPG (medium pulse gate) on line 144.

The gated oscillator 704 has its input set gate fed by the MPG output of flip-flop 701 on line 144. The Q and $\overline{Q}$ outputs of oscillator 704 are designated SPC (short pulse clock) on line 146 and $\overline{SPC}$ on line 147. The SPC output on line 146 is fed to the set trigger and clear trigger of flip-flop 707. The Q and $\overline{Q}$ outputs of flip-flop 707 are designated SPG (short pulse gate) on line 148 and its complement $\overline{SPG}$ on line 149. The RES reset signal on line 52 is fed to the clearing reset inputs of flip-flops 701 and 707.

Referring to the pulse diagrams of FIG. 13I, it will be seen that the result of activating the MPG flip-flop 701 is to produce two full cycles of the SPC oscillator 704. The half cycle time constant is 0.1 millisceond. The wave forms which are combined to produce one group of alpha, beta and gamma pulses are further described in connection with FIG. 13K hereinbelow.

The short pulse generator gates 716, FIG. 13J, comprise three AND gates 717, 718 and 719. AND gate 717 is fed by the MPG signal on line 144, the $\overline{SPC}$ signal on line 147 and the $\overline{SPG}$ signal on line 149.

AND gate 718 is fed by the ENT signal on line 35, the SPC signal on line 146 and the SPG signal on line 148. AND gate 719 is fed by the $\overline{SPC}$ signal on line 147 and the SPG signal on line 148. These input signals are produced by the short pulse generator 700 with the exception of the ENT signal which is produced by the control pulse generator gate 641.

The short pulse generator gates produce the alpha pulse, beta pulse and gamma pulse which are used in controlling the system as was described. The pulse diagram of FIG. 13K shows the wave forms which are combined by the short pulse generator gates to produce the alpha, beta and gamma pulses, each of which has a duration of 0.1 millisecond. As shown by the designated inputs to the short pulse generator gates in FIG. 13J, the wave forms that are combined to produce the alpha, beta and gamma pulses are as follows:

$$MPG+\overline{SPC}+\overline{SPG}=\text{Alpha}$$
$$ENT+SPC+SPG=\text{Beta}$$
$$\overline{SPC}+SPG=\text{Gamma, (Gamma Bar)}$$

The alpha pulse on line 26 is fed to the input character counter 731 and the buffer control registers 500. The beta pulse on line 24 is fed to the buffer gates of the buffer gates and registers 230. The gamma pulse is fed on line 25*a* to the buffer control gate 472. Gamma bar is fed to tab gates 800 on lines 25*b*.

FIG. 14 shows a timing pulse diagram for the control pulse generator 640, upon entry of a remote enter character command, ENTR, with the feedback switch in the "off" position and with the feedback switch in the "on" position.

Input counter 731 and tab decoder 751

The input counter 731, FIG. 15A, counts up the number of alpha pulses generated in entering character signals and executing tab and other spacing commands. The counter cooperates with the tab decoder and tab switches to provide the programmed tabular settings for the printout.

As shown in FIG. 15A, the input counter is composed of three groups, Group I, Group II and Group III. Each group comprises a NAND gate, such as NAND 732 in Group I, and a sequence of binary flip-flops indicated in Group I as binary flip-flops 733 through 736. Alpha pulses are fed on line 26 to binary flip-flop 733 and serve as the input to the counter.

Cable 755 connects the outputs of binary flip-flops 733–736 of Group I to the corresponding digital input terminals of the units decoder board 752. Cable 756 connects the outputs of the binary flip-flops of Group II to the corresponding digital input terminals of the tens decoder board 753. Cable 757 connects the outputs of the binary flip-flops of Group III to the corresponding digital input terminals of the hundreds decoder board 754.

Each of the decoder boards 752–754 provides diode interconnections between its digital input terminals and its decimal output terminals as shown in FIG. 16B. As shown in FIG. 16A, the ten decimal output terminals of the decoder boards 752 and 753 and the indicated six of board 754 are connected to a corresponding number of lines which are grouped, respectively, as cables 758, 759 and 760. These cables are combined into cable 680 to provide one of the plurality of cables 679–688 between the tab decoder 751 and the tab panel switches 781, as indicated in FIGS. 2A and 2B.

The alpha pulses are received in series at the input of binary flip-flop 733 in Group I as represented by the uppermost train of pulses in FIG. 15C. Though the time interval between the alpha pulses as shown in FIG. 15C is uniform, it will be understood that the shortest interval will be determined by the time cycle of the control pulse generator 640. On the other hand, longer time intervals will occur, depending upon the rate of operation or the rest periods of the transmitter. Starting with a decimal count of zero, that is, with the printer clear and the carriage at rest, Groups I, II and III provide at the output terminals of their binary flip-flops a parallel binary code corresponding to the decimal count of the alpha pulses. As shown in FIG. 15B, a "2*–4–2–1" binary code is used and the corresponding output terminals of the binary flip-flops are identified in FIG. 15A in accordance with these binary digits and their complements, e.g., the Q and $\overline{Q}$ outputs of binary flip-flop 733 are designated "1" and "$\overline{1}$," and the Q and $\overline{Q}$ outputs of binary flip-flops 736 are designated "2*" and "$\overline{2}$". The arrangement is such that upon the receipt of each successive alpha pulse, the appropriate binary code, as indicated in FIG. 15B, is fed in parallel by cable 755 to the corresponding digital input terminals of decoder board 752 for each units count. Similarly, cable 756 feeds the appropriate tens count to the digital input terminals of decoder board 753, to accumulate the tens count, and cable 757 serves the same purpose between the three binary flip-flop in Group III and the corresponding digital input terminals of decoder board 754 to accumulate the hundreds count.

Tab panel switches 781

The tab "decoder' 'switch panel comprises ten sets of tab switches, the thirty dials of which are shown in FIG. 17A. Each dial is inscribed with the decimal numbers 0–9 so positioned with respect to its zero set as to correspond with the position of its switch arm relative to the associated contacts. Each set is composed of three switches, one for the units position, one for the tens position and one for the hundreds position. The set of three switches labelled "begin Margin" determines where the printhead 70 stops relative to the paper chart for the "begin margin" or programmed start position. Another set of switches marked "carriage return" determines the number of character spaces at which the carriage return signal will be activated. The remaining sets of switches designated tab number 1 through tab number 8 are used to set those character space positions at which the print carriage 70 will stop when the tab mode is activated. Any set of three switches set to 000 is inactive. As shown in FIG. 17B in connection with the tab No. 1, the dials of each set of three switches, from right to left are connected, respectively, to the arms 180, 181 and 182 of the manually settable contacts of three decades. It will be noted that the hundreds position switch has only six positions, because the largest number that can be selected for use is less than than 600 in the present arrangement.

The diode matrix of each of the three decoder boards 752–854 is so arranged that with a zero count in the counter each decoder board will have a logical "0" output at its decimal zero output line. Furthermore, for any given number between 1 and 599 that is counted, only the decimal terminals of the three decoder boards identifying that number will be in the condition of logical "0." All of the remaining decimal terminals will be at logical "1." The decimal outputs from the decoder board 752 are connected over cable 758 to the corresponding contacts of the units (U) decade shown in FIG. 17B. Similar connections are provided over cable 759 and 760 for the decoder boards 753 and 754 to the corresponding contacts of the tens (T) and hundreds (H) decades, respectively.

As was noted, there are ten sets of three decade counters, each associated with the ten sets of dials included in the tab panel switches 781. Ten cables 619–628, each containing three lines (FIGS. 2) provide connections between the U, H and T arms of each set on the one hand and the corresponding NOR gate of the tab gates 800 on the other.

Whenever the number called for on the dials of one of the sets of tab panel switches is matched by the decoder boards, the output from the arms of each of the three decades of the set will be at logical "0" and will actuate its associated NOR gate.

As was described hereinabove, at the start of the return mode, the input counter was automatically shifted to the arbitrarily selected number 575, the carriage was then advanced to bring the counter to 596 and then, following activation of the WCR (wired carriage return) signal, the carriage was reversed. This WCR signal is generated by providing an eleventh set of decades which are permanently set so that in response to a decimal count of 596 from the decoder boards, the three input lines (designated 5, 9 and 6) of NOR gate 801 (FIG. 18A) are each at logical "0."

Tab gates 800

Referring to FIG. 18A, tab gates 800 comprise eleven NOR gates 802, each of which has three inputs designated H, T and U connected as was just described to one of the sets of tab switches as indicated in FIG. 18A. An additional NOR gate 801 also has three inputs in this case designated 5, 9 and 6 and connected to the wired carriage return switch.

The outputs of NOR 802 through 810 feed to OR gate 812. NOR gate 811 generates a TCR or tab carriage return signal on line 31 when activated. This TCR signal on line 31 is fed to the control pulse generator 640 at the control pulse generator gate 641. OR gate 813 is fed by the wired carriage return WCR, by the output of OR gate 812 and by the ENT signal on line 35 from the control pulse generator gate 641. The output of OR gate 813 is labelled TBG or tab gating pulse on line 27.

NAND gate 814 is fed a gamma bar pulse on line **25*b* and the output of NAND gate 815. NAND gate 815 is fed an ENT signal on line 35, and LPC signal on line 38 and a FBD signal on line 21*a*. The outputs of NAND gates 814 and 815 are fed to NAND gate 816 whose output is labelled TBS or tab stop on line 28. Output lines 27 and 28 labelled TBG and TBS feed to the long pulse gate 676 of the control pulse generator 640**.

The function of the tab gates is to generate a tab stop pulse TBS and a tab stop gate level TBG for the long pulse generator 676. A logical "1" will be present at TBG line 27 under the following conditions:

(1) When an enter command pulse ENTR is received on line 14 which activates the ENT flip-flop 651 of the control pulse generator gate 641, causing ENT line 35 to turn on.

(2) When the number selected on the begin margin switch matches the number accumulated in the input character counter 731.

(3) When any of the eight tab numbers selected matches the accumulated number in the input character counter 731.

(4) When the accumulated count in the character counter reaches 596 and therefore matches the wired carriage return OR gate 801.

A tab stop or TBS pulse will be generated under the following conditions:

(1) If the FBD switch 21 is "off" and a gamma bar pulse is generated on line **25*b***.

(2) If the FBD switch 21 is "on" and the ENT flip-flop 651 is also "on," then a TBS pulse will be generated at the end of the LPC cycle.

(3) If the FBD switch 21 is "on," the ENT flip-flop 651 is "off," and a gamma bar pulse is generated on line **25*b***.

FIG. 18B shows the output pulses generated with the FBD switch 21 "on" when an ENTR signal is received.

Limit switch registers 841

The limit switch registers 841 (FIG. 20) cooperate with begin switch (BSW) 61 and end switch (ESW) 63. The limit switch registers flip-flop 849 and flip-flop 850 provide a means for storing the information that a particular limit switch has been activated. The flip-flop 849, which provides the CRG signal, is activated when the end switch (ESW) 63 is closed. This occurs when the printhead carriage 70 reaches the right-hand limit of its permited travel. When flip-flop 849 is activated, the printer in response to the CRG signal goes into the carriage return mode. This flip-flop can also be activated by the WCR (wired carriage return) signal on line 108 which is activated by the tab gate 801. The clearing reset input to this flip-flop is the reset (RES) on line 52 from the reset gates 526.

The FWM (forward to margin) flip-flop 850 is activated when the printhead carriage 70 operates the begin switch BSW 61 at the left-hand margin. This puts the printer into the forward to margin mode previously described. The occurrence of a PPS signal on the input line 30*a* is to clear flip-flop 850, thereby terminating the forward to margin mode. This flip-flop can also be cleared by the TMD (time delay) signal on line 51 from the reset gates 526.

Paper advance gates 616

The paper advance gates 616, FIG. 21A, initiate the advance of the paper chart in response to actuation of local paper advance switch (ADVL) 58 or from a remote paper advance (ADVR) signal. NAND gate 617 is fed a CRG (carriage return gate) signal on line 20*a* and an RPA (return with paper advance) signal on line 39*a*. NAND 618 is fed by an ADVR (advance paper remote) signal on line 13 from the remote transmitter, by the printer clear or PCL line 7, and by the line from remote switch 60. NAND gate 619 is fed an advance paper signal ADVL from the ADVL switch 58 on line 58*a* and by the line from remote/local switch 60. The outputs of these gates are fed to AND gate 620 coupled with Schmitt trigger 621 which feeds to NOR gate 622. The outputs of NOR gate 622 and NAND gate 619 feed to flip-flop 623 whose output lines 49 and 67 are designated PAG (paper advance generator) and $\overline{PAG}$. Line 49 feeds gated oscillator 624 whose Q and $\overline{Q}$ outputs are designated PAC (paper advance clock) on line 117 and $\overline{PAC}$ on line 118. Line 118 feeds $\overline{PAC}$ to NAND gate 625 which in turn feeds to $\overline{Q}$ output on line 19 marked PAD (paper advance drive) to pulse the advance paper solenoid 106.

The paper advance gates 616 operate the paper advance solenoid 106 under the following conditions:

(1) If the return with paper advance RPA switch 39 is "on," and the carriage is in the carriage return mode, and CRG is "on" or logical "1."

(2) If a paper advance signal from the remote location is received, ADVR is equal to "1" on line 13 and the printer is clear, line 7 is "on," (*PCL–L*—"1"), and the remote/local switch 60 is in the remote position.

(3) If a paper advance signal from the local position is received on line 58*a* (*ADVL*="1") and the printer is in the local switch mode. Also, if the local advance switch 58 is kept continuously "on," the paper advance generator 623 will cycle a paper advance every 0.8 second until the advance switch is returned to "off." Thus, the local ADVL advance switch 58 can provide either single paper advances by momentary contact or continuously stepped paper advance by continuous contact.

The operation of flip-flop 623 and gated oscillator 624 is similar to that of the long pulse generator 676 (FIG. 13C). When the PAG flip-flop 623 is turned"on," it gates the oscillator 624 "on." The half cycle time of the oscillator is 0.4 second. FIG. 21B shows the pulse diagrams for the single paper advance mode and FIG. 21C shows the pulse diagrams for the multiple paper advance mode.

Feedback gates 600

The feedback gates as shown in FIG. 22 provide a feedback (PCLR) signal to the remote transmitter on line 127 when the printer is clear and provide a feedback (PCL–L) signal to the internal circuitry of the printer when the printer is clear. By clear is meant the printer's ability to accept further input signals. Referring to FIG. 22, the OR gate 601 is fed a paper advance generator signal PAG on line 49, the long pulse gate signal LPG on line 33, the carriage return gate or CRG signal on line 20*a*, the FWM or forward to margin signal on line 18 and the BG5 signal on line 512 from the buffer control registers 500. The output of OR gate 601 is fed to NOR gate 602 and to NOR gate 603 to provide two outputs PCLR on line 127 for the remote transmitter circuits and the PCL–L signal on line 7 for local circuits. Also NOR gate 602 is fed by an LOC input on line 60*b* from the remote/local switch 60.

The feedback signals PCLR and PCL–L for local and remote use are in the "off" state under the following conditions (that is, the printer is busy):

(1) If the paper is being advanced, PAG "on" (equal to "1").

(2) If the long pulse generator LPG is "on."

(3) If the printer is in the carriage return mode, CRG "on."

(4) If the printer is in the forward to margin mode, FWM "on."

(5) If the buffer control registers are completely filled which means that BG5 is "on."

Also, the feedback signal PCLR for remote use is turned "off" if the remote/local switch 60 is in its local position.

Reset gates

As shown in FIG. 23 the reset gate comprise four OR gates 528, 529, 530 and 531. Each OR gate is fed the output of a time delay circuit 527 whose output is labelled TMD on line 51. The line 61*a* from begin switch BSW 61 feeds OR gates 528, 529 and 531. The CRG or carriage return gate line 20*a* feeds OR gate 529 and OR gate 530. The carriage return single shot signal RET on line 34 feeds OR gate 531. The output of OR gate 528 on line 52 is labelled RES and provides a reset signal used throughout the system. The output of OR gate 529 is labelled BCR on line 44. The output of OR gate 530 is labelled BER on line 43. The output of OR gate 531 is labelled CRR on line 32.

The TMD signal on line 51 provides a time delay signal (*TMD*="1") when the printer power switch 124 is first turned on. After a time delay of approximately one second, the TMD signal changes to logical "0." A reset pulse (*RES*="1") is activated with the occurrence of either the TMD or BSW signal. The BCR reset signal occurs with either the activation of the BSW begin switch 61 or the CRG carriage return gate signal or the TMD signal. The BER signal turns on with the occurrence of the CRG signal or the TMD signal. The BCR and BER signal lines are connected to the buffer control registers as described previously. The CRR signal turns on with the occurrence of either the TMD signal (line 51), the BSW signal (line 61*a*), or the RET signal (line 34). The CRR signal line feeds to the input character counter (731) and the control pulse generator gates (641).

The TMD reset pulse on line 51 is provided for presetting certain flip-flops when the printer power switch POW 124 is turned on. The reset pulse RES on line 52 is used throughout the system to reset most of the bistable elements at power turn on and also when the printhead carriage 70 activates the begin switch BSW 61. The BCR signal on line 44 provides a reset pulse with the activation of the carriage return signal CRG on line 20*a*. The BCR signal is also activated when either BSW 61 is actuated or TMD 51 equals logical "1." The BCR reset pulse is used in the buffer control registers 500. The BER reset pulse is used to deactivate three registers in the buffer control registers 500 during power turn on and during the activation of the carriage return gate (CRG signal) but not during the activation of the begin switch BSW 61, since the begin switch is used to activate three of the buffer control gates whereby to advance the carriage as previously explained.

As shown in FIG. 2A, the present system may be used with a conventional coder adaptor 101 so that the system may be readily adapted to receive binary coded data from a transmitter which uses a binary code which differs from the "8–4–2–1–U" binary code of the printer. Ignoring the "U" digit, binary "0–0–0–0" is used to generate a space along the printing line, while binary "1–0–1–0" equals decimal zero as printed out in the present printer. On the other hand, in other binary codes that are conventionally used, the binary code for a "space" and decimal zero are often reversed from that used herein, so that the binary code for decimal zero is "0–0–0–0," while that for a "space" is "1–0–1–0." The function of the adaptor is to reverse these so that binary coded data from transmitters using such codes may be received by the printer and properly printed out.

Referring to FIG. 24A and FIG. 24B, a flip-flop 866 is activated at all times that the first buffer control register is "on" by BG1 equal to logical "1" on line 508. The flip-flop 866 functions as the ribbon motor relay flip-flop and, when activated, closes the normally open switch 869 by energizing relay coil 867. When switch 869 is closed both of the ribbon spool drive motors 68L and 68R are energized and one or the other is in driving engagement with its spool so that the ribbon will be continuously driven past the printhead hammers first in one direction and then in the other, thereby providing freshly inked ribbon for each impression. When BG1 is in its "off" condition equal to logical "0," the carriage is at rest. However, pulse generator 870, connected between line 508 and the clear input of FF866, provides a predetermined time delay extending from the last time BG1 went to logical "0" before it generates its output pulse which serves to turn "off" FF866. In practice, a suitable time delay is 15 seconds. Upon deactivation of FF866, relay contacts 869 are opened and the motors 68L and 68R are deenergized.

The flip-flop 866 is turned "on" by the reset signal RES on line 52 fed to its set (S) input, so that when power is turned on to the printer, the ribbon will be driven for fifteen seconds to take up any slack in tension. The resistor 871 and capacitor 872 across relay contacts 869 provide arc suppression for the motor voltage circuit.

Referring to FIG. 24B, the ribbon reversing circuit comprises a bistable relay whose coil 873 is a magnetically latched reed relay whose state is determined by the direction of the current through the coil 873. When the ribbon 76 (FIG. 1) has been completely unwound from the left side spool 99L, the resulting increase in ribbon tension causes the left tension switch 66L to close, passing current from left to right through the bistable relay coil 873 to close contacts 875 and open contacts 876. The left solenoid 69L is now energized and the right solenoid 69R is deenergized. On being energized, the left solenoid 69L retracts its plunger and thereby draws motor 68L upward against spool 99L to drive the spool. As was noted, motor 68L, like motor 68R, is always running when power is on to the printer. The arrangement for the right side is the same as that on the left, corresponding parts being designated with the suffix R. Thus, alternate engagement of first one motor and then the other with its spool serves to reverse periodically the direction of the ribbon.

While the present invention has been described in detail in connection with an essentially numeric character printer, it is to be understood that the nature of the characters may be varied at will to include any that may be desired. Thus, in addition to a numeric printer, it is also contemplated that character hammers bearing the letters of the alphabet, for example, may be used or combinations of alphabetic and numeric characters so as to provide an alpha-numeric printer. Furthermore, while the present printer embodiment contains fifteen character hammers, it is to be understood that a larger or smaller number of hammers may be used as desired.

The control system of the present invention is especially suited for and is most advantageously used to provide a unique printer. However, it is to be understood that the control system is susceptible of use in controlling a wide variety of mechanical operations. For example, instead of a printer, a machine tool may be controlled having a carriage which is translated along the work piece through a succession of positions. The carriage may be provided with a plurality of different machine tool devices which may be put into operation in successive positions as dictated by the code signals.

As was noted, it is not intended that the present invention be limited to the use of the precise number of print hammers, that is fifteen, described herein, nor is it intended that this application be limited to the specific "8–4–2–1–U" code disclosed herein. For this reason and also for the sake of simplifying the appended claims, the following notation has been adopted. The five digit code is represented by the generalized expression "$\underline{x+1}$" to indicate that at least one or as may additional bits as may be desired may be used in formulating the code. Similarly, the number of print hammers or operations which may be selected for any given position has been generalized as "$\underline{k+1}$," and the same expression has been used to generalize the number of ranks of the storage register. In the buffer register, the number of files into which the bits of a given code signal are entered have been generalized as "$\underline{x+1}$," while the number of ranks has been generalized as "$\underline{m+1}$." It will be noted in connection with the buffer register that, while in the embodiment herein disclosed, only six ranks have been shown, a larger or smaller number may be used as desired.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a system for controlling mechanical means in response to code signals each of which contains $\underline{x+1}$ data bits and in which said mechanical means is displaced along a predetermined path relative to a reference point through a succession of positions for the performance of any one of $\underline{k+1}$ kinds of operations at said positions with a different signal representing each of said operations, buffer storage means for receiving in series and storing a succession of said signals in one code and having $\underline{x+1}$ files of devices forming $\underline{m+1}$ ranks with $\underline{x+1}$ devices in each rank, first circuit means for sequentially gating said signals into said buffer storage means and including means for generating a plurality of a first kind of pulses one for each of said gated signals, second means connected to said buffer storage means for receiving in parallel the $\underline{x+1}$ bits of each of said signals from said buffer storage means, said second means including decoder means for decoding the $\underline{x+1}$ bits of each of said signals into an output-representative of its corresponding one of said operations, first motive means for displacing said mechanical means along said path relative to said reference point, second motive means connected to said decoder means and responsive to each of said output-representatives for actuating said mechanical means to perform its corresponding operation, means including second circuit means responsive to displacement of said mechanical means from said reference point through each successive position along said path for generating synchronizing pulses with each successive pulse corresponding respectively to the location of each successive position occupied by said mechanical means relative to said reference point, said buffer storage means in response to each of said synchronizing pulses successively transferring in parallel the $\overline{x+1}$ bits of a signal in its $\overline{m+1}$th rank to said second means and simultaneously advancing the $\overline{x+1}$ bits in its remaining ranks in parallel to the next rank, difference means including summing means and responsive to said first kind of pulses and said synchronizing pulses for providing a difference signal indicating the difference between the sum of said first kind of pulses and the sum of said synchronizing pulses, and means responsive to said difference signal for activating said first motive means to displace said mechanical means along said path when said difference is greater than zero and for deactivating said first motive means to arrest said mechanical means when said difference is equal to zero.

2. A system for controlling mechanical means as set forth in claim 1, in which said first motive means increases the speed of said mechanical means along said path in accordance with the extent to which said difference is greater than zero.

3. A system as set forth in claim 1 in which the $x+1$th data bit alone of each signal is representative of and is sufficient to identify the $\overline{k+1}$th kind of operation and the remaining $x$ data bits serve to represent any one of the remaining $\overline{k}$ operations, and said second motive means in response to any one decoding means output-representative is adapated to perform concurrently said $\overline{k+1}$th kind of operation and any one of the $\overline{k}$ remaining operations.

4. A system as set forth in claim 1 in which said second means includes second storage means having $k+1$ ranks of devices one corresponding to each of the $\overline{k+1}$ different signals representing respectively each of said $\overline{k+1}$ kinds of operations, third circuit means connecting each of said $\overline{k+1}$ ranks to said decoder means whereby any one of said signals upon arriving in the corresponding one of said $\overline{k+1}$ ranks is decoded by said decoder means, said storage means in response to each to each of said synchronizing pulses successively transferring in parallel the bits of each of the signals received from said buffer storage means from one of its ranks to the next adjacent rank until the signal arrives at the rank where it is decoded, and at the first of the $\overline{k+1}$ ranks of said second storage means having $\overline{x+1}$ files of devices and each succeeding rank has devices in those of its files required for decoding its corresponding signal and for transferring on those signals corresponding to the succeeding ranks.

5. A system as set forth in claim 4 in which said decoder means includes $\overline{k+1}$ circuit means one connected to the respective one of each of the $\overline{k+1}$ ranks of said second storage means for NORing predetermined outputs of the devices in the rank to which it is connected.

6. A system as set forth in claim 1 in which fourth circuit means are connected to the devices in the first through the $\overline{m}$th rank of said buffer storage means for clearing the $\overline{m-n}$th rank of said buffer storage means and all of its preceding ranks, $\overline{n}$ being equal to said difference, after the pulse of said first kind associated with a given signal and before the entering of the next signal into said buffer storage means.

7. A system as set forth in claim 1 in which said difference means contains $\overline{m+1}$ bistable devices corresponding respective to the $\overline{m+1}$th through the first ranks of said buffer storage means in that sequence, means connecting said $\overline{m+1}$ devices of said difference means to said first circuit means and said second circuit means so that the number of said $\overline{m+1}$ difference devices in a given condition is equal to said difference, and fifth circuit means connecting devices of said difference means to corresponding ranks of said buffer storage means for enabling or inhibiting the ranks of said buffer storage means to receive a code signal in accordance with said given condition of the corresponding one of the devices in said difference means.

8. A system as set forth in claim 1 in which a reference pulse is associated with each of said code signals, and said first circuit means includes buffer storage gating means connected to the devices in the first rank of said buffer storage means, said first circuit means further including means for generating a plurality of a second kind of pulses one for each of said reference pulses, and said buffer storage gating means in response to each of said second kind of pulses gating into the devices of the first rank of said buffer storage means $\overline{x+1}$ data bits of the code signal associated with the reference pulse to which the second kind of pulse corresponds.

9. A digital signal responsive device for use with signals each of which contains $\overline{x+1}$ bits, comprising $\overline{x+1}$ files of bistable devices forming $\overline{m+1}$ ranks with $\overline{x+1}$ devices in each rank, first circuit means for sequentially gating said signals into the first of said ranks with each of the $\overline{x+1}$ bits thereof in parallel entering the corresponding one of said files and including means for generating a plurality of a first kind of pulses one for each of said gated signals, second circuit means connected to each of said bistable devices in said $\overline{m+1}$ ranks and for generating synchronizing pulses, each of the bistable devices in the $\overline{m+1}$th rank in response to each successive synchronizing pulse providing in parallel an output corresponding to the $\overline{x+1}$ bits of the signal located therein and simultaneously advancing the $\overline{x+1}$ bits in the remaining ranks in parallel to the next rank, difference means including summing means responsive to said first kind of pulses and said synchronizing pulses for providing a difference signal indicating the difference between the sum of said first kind of pulses and the sum of said synchronizing pulses, and means responsive to said difference signal for activating said synchronizing pulse generating means when said difference is greater than zero.

10. In a device responsive to digital signals, first circuit means for generating a plurality of a first kind of pulses one for each of said signals, second circuit means for generating synchronizing pulses one associated with each of said first kind of pulses, difference means including summing means responsive to said first kind of pulses and said synchronizing pulses for providing a difference signal indicating the difference between the sum of said first kind of pulses and the sum of said synchronizing pulses, and means responsive to said difference signal for activating said synchronizing pulse generating means when said difference is greater than zero and deactivating said synchronizing pulse generating means when said difference is equal to zero.

11. A printing system as set forth in claim 13 in which said first motive means increases the speed of said print carriage along said print line in accordance with the extent to which said difference is greater than zero.

12. In a printing system having a movable print carriage displaceable along each print line relative to a reference point and carrying printing means for printing any one of $\underline{k+1}$ characters at each print position on a record medium in response to $\underline{k+1}$ code signals each of which contains $\underline{x+1}$ data bits and with a different code signal for each of said $\underline{k+1}$ characters, buffer storage means for receiving in series and storing a succession of said signals in one code and having $\underline{x+1}$ files of devices forming $\underline{m+1}$ ranks with $\underline{x+1}$ devices in each rank, first circuit means for sequentially gating said signals into said buffer storage means and including means for generating a plurality of a first kind of pulses one for each of said gated signals, second means connected to said buffer storage means for receiving in parallel the $\underline{x+1}$ bits of each of said signals from said buffer storage means, said second means including decoder means for decoding the $x+1$ bits of each of said signals into an output-representative of its corresponding one of said characters, first motive means for displacing said print carriage along a print line relative to said reference point, second motive means connected to said decoder means and responsive to each of said output-representatives for actuating said printing means to perform its corresponding operation, means including second circuit means responsive to displacement of said print carriage from said reference point through each successive position along said print line for generating synchronizing pulses with each successive pulse corresponding respectively to the location of each successive position occupied by said print carriage relative to said reference point, said buffer storage means in response to each of said synchronizing pulses successively transferring in parallel the $x+1$ bits of a signal is its $m+1$th rank to said second means and simultaneously advancing the $x+1$ bits in its remaining ranks in parallel to the next rank, difference means including summing means and responsive to said first kind of pulses and said synchronizing pulses for providing a difference signal indicating the difference between the sum of said first kind of pulses and the sum of said synchronizing pulses, and means responsive to said difference signal for activating said first motive means to displace said print carriage along said print line when said difference is greater than zero and for deactivating said first motive means to arrest said print carriage when said difference is equal to zero.

13. In a printing system having a movable print carriage displaceable along each print line relative to a reference point and supporting $k+1$ print hammers each carrying a different one of $k+1$ characters for printing at each print position on a record medium in response to $k+1$ code signals each of which contains $x+1$ data bits and with a different code signal for each of said $k+1$ characters, buffer storage means for receiving in series and storing a succession of said signals in one code and having $x+1$ files of devices forming $m+1$ ranks with $x+1$ devices in each rank, first circuit means for sequentially gating said signals into said buffer storage means and including means for generating a plurality of a first kind of pulses one for each of said gated signals, second means connected to said buffer storage means for receiving in parallel the $x+1$ bits of each of said signals from said buffer storage means, said second means including decoder means for decoding the $x+1$ bits of each of said signals into an output-representative of its corresponding one of said characters, first motive means for displacing said input carriage along a print line relative to said reference point, second motive means connected to said decoder means and responsive to each of said output-representatives for actuating the corresponding one of said print hammers, means including second circuit means responsive to displacement of said mechanical means from said reference point through each successive position along said print line for generating synchronizing pulses with each successive pulse corresponding respectively to the location of each successive position occupied by said print carriage relative to said reference point, said buffer storage means in response to each of said synchronizing pulses successively transferring in parallel the $x+1$ bits of a signal in its $m+1$th rank to said second means and simultaneously advancing the $x+1$ bits in its remaining ranks in parallel to the next rank, difference means including summing means and responsive to said first kind of pulses and said synchronizing pulses for providing a difference signal indicating the difference between the sum of said first kind of pulses and the sum of said synchronizing pulses, and means responsive to said difference signal for activating said first motive means to displace said print carriage along said print line when said difference is greater than zero and for deactivating said first motive means to arrest said print carriage when said difference is equal to zero.

14. Apparatus as set forth in claim 10 in which said difference signal responsive means actuates said synchronizing pulse generating means to increase the rate at which said synchronizing pulses are generated in accordance with the extent to which said difference is greater than zero.

15. A printing system as set forth in claim 13 in which the $x+1$th data bit alone of each signal is representative of and is sufficient to identify the $k+1$th print hammer and the remaining $x$ data bits serve to represent any one of the remaining $k$ print hammers, and said second motive means in response to any one decoding means output-representative is adapted to actuate concurrently said $m+1$th print hammer and any one of $k$ remaining print hammers.

16. A printing system as set forth in claim 13 in which said second means includes second storage means having $k+1$ ranks of devices one corresponding to each of the $k+1$ different signals representing respectively each of said $k+1$ print hammers, third circuit means connecting each of said $k+1$ ranks to said decoder means whereby any one of said signals upon arriving in the corresponding one of said $k+1$ ranks is decoded by said decoder means, said storage means in response to each of said synchronizing pulses successively transferring in parallel the bits of each of the signals received from said buffer storage means from one of its ranks to the next adjacent rank until the signal arrives at the rank where it is decoded, and the first of the $k+1$ ranks of said second storage means having $x+1$ files of devices and each succeeding rank has devices in those of its files required for decoding its corresponding signal and for transferring on those signals corresponding to the succeeding ranks.

17. A printing system as set forth in claim 19 in which said decoder means includes $k+1$ circuit means one connected to the respective one of each of the $k+1$ ranks of said second storage means for NORing predetermined outputs of the devices in the rank to which it is connected.

18. A printing system as set forth in claim 11 in which fourth circuit means are connected to the devices in the first through the $m$th rank of said buffer storage means for clearing the $m-n$th rank of said buffer storage means and all of its preceding ranks, $n$ being equal to said difference, after the pulse of said first kind associated with a given signal and before the entering of the next signal into said buffer storage means.

19. A printing system as set forth in claim 13 in which said difference means contains $m+1$ bistable devices corresponding repsectively to the $m+1$th through the first ranks of said buffer storage means in that sequence, means connecting said $m+1$ devices of said difference means to said first circuit means and said second circuit means so that the number of said $m+1$ difference devices in a given condition is equal to said difference, and fifth circuit means connecting devices of said difference means to corresponding ranks of said buffer storage means for enabling or inhibiting the ranks of said buffer storage means to receive a code signal in accordance with said given condition of the corresponding one of the devices in said difference means.

20. A printing system as set forth in claim 13 in which a reference pulse is associated with each of said code signals, and said first circuit means includes buffer storage gating means connected to the devices in the first rank of said buffer storage means, said first circuit means further including means for generating a plurality of a second kind of pulses one for each of said reference pulses, and said buffer storage gating means in response to each of said second kind of pulses gating into the devices of the first rank of said buffer storage means the $x+1$ data bits of the code signal associated with the reference pulse to which the second kind of pulse corresponds.

(References on following page)

References Cited

UNITED STATES PATENTS

| | | |
|---|---|---|
| 2,776,618 | 1/1957 | Hartley. |
| 3,248,692 | 4/1966 | Shih. |
| 3,240,920 | 3/1966 | Barbagallo et al. |
| 2,966,113 | 12/1960 | Deerfield et al. |

MAYNARD R. WILBUR, Primary Examiner

THOMAS J. SLOYAN, Assistant Examiner

U.S. Cl. X.R.

101—93; 178—17.5; 197—20; 235—61.7, 61.8, 61.9; 340—146.1